(12) United States Patent
Alvarez Barrio et al.

(10) Patent No.: US 11,538,480 B1
(45) Date of Patent: Dec. 27, 2022

(54) INTEGRATION OF SPEECH PROCESSING FUNCTIONALITY WITH ORGANIZATION SYSTEMS

(71) Applicant: Amazon Technologies, Inc., Seattle, WA (US)

(72) Inventors: Gonzalo Alvarez Barrio, Seattle, WA (US); Shantanu Vikas Kurhekar, Redmond, WA (US); Bharath Bhimanaik Kumar, Sammamish, WA (US); Fred Torok, Mercer Island, WA (US); Frederic J Deramat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 80 days.

(21) Appl. No.: 17/217,915

(22) Filed: Mar. 30, 2021

(51) Int. Cl.
| | |
|---|---|
| *G10L 15/22* | (2006.01) |
| *G10L 15/18* | (2013.01) |
| *G10L 15/30* | (2013.01) |
| *H04W 8/00* | (2009.01) |
| *H04W 88/08* | (2009.01) |

(52) U.S. Cl.
CPC ......... *G10L 15/22* (2013.01); *G10L 15/1815* (2013.01); *G10L 15/30* (2013.01); *H04W 8/005* (2013.01); *G10L 2015/223* (2013.01); *G10L 2015/228* (2013.01); *H04W 88/08* (2013.01)

(58) Field of Classification Search
USPC ...................................................... 704/1–504
See application file for complete search history.

(56) References Cited

U.S. PATENT DOCUMENTS

| | | | |
|---|---|---|---|
| 9,311,656 B2* | 4/2016 | Barnes, Jr. | ............. G06Q 30/08 |
| 9,996,315 B2* | 6/2018 | Barnes, Jr. | ......... G06Q 30/0259 |
| 11,182,121 B2* | 11/2021 | Barnes, Jr. | .......... G06F 3/04842 |
| 2005/0136949 A1* | 6/2005 | Barnes, Jr. | ......... G06Q 30/0236 |
| | | | 455/461 |
| 2012/0086549 A1* | 4/2012 | Barnes, Jr. | ............. G06Q 20/04 |
| | | | 340/5.61 |
| 2012/0096358 A1* | 4/2012 | Barnes, Jr. | ............. G06Q 20/20 |
| | | | 715/728 |
| 2013/0096966 A1* | 4/2013 | Barnes, Jr. | ......... G06Q 30/0601 |
| | | | 705/14.57 |
| 2015/0234636 A1* | 8/2015 | Barnes, Jr. | ............ H04M 1/724 |
| | | | 715/728 |
| 2017/0201411 A1* | 7/2017 | Mladin | ................. H04L 41/042 |
| 2019/0354634 A9* | 11/2019 | Barnes, Jr. | ............ G06F 40/169 |

* cited by examiner

*Primary Examiner* — Marcus T Riley
(74) *Attorney, Agent, or Firm* — Lee & Hayes, P.C.

(57) ABSTRACT

Systems and methods for integration of speech processing functionality with organization systems are disclosed. For example, a voice interface application may be created to enable a voice interface functionality for devices associated with an organization. Space identifiers of spaces of the organization may be created and associated with the voice interface application. Devices associated with the space identifiers may be enabled for utilizing the voice interface application and may be set up utilizing wireless network identifiers associated with the spaces and/or the organization.

20 Claims, 18 Drawing Sheets

900

```
┌─────────────────────────────────────────────────────────────────┐
│  Generate first data indicating principal identifiers for       │
│  principals associated with voice interface devices             │
│                           902                                    │
└─────────────────────────────────────────────────────────────────┘
                              │
                              ▼
┌─────────────────────────────────────────────────────────────────┐
│  Generate second data indicating resource identifiers for       │
│  resources that are controllable utilizing voice interface      │
│  devices                                                         │
│                           904                                    │
└─────────────────────────────────────────────────────────────────┘
                              │
                              ▼
┌─────────────────────────────────────────────────────────────────┐
│  Generatie third data indicating permissions configured to be   │
│  applied to use of resources by principals, permissions         │
│  indicating at least context associated with request to utilize │
│  resources by principals                                         │
│                           906                                    │
└─────────────────────────────────────────────────────────────────┘
                              │
                              ▼
┌─────────────────────────────────────────────────────────────────┐
│  Store, in database, fourth data representing policies          │
│  indicating application of at least one of permissions to at    │
│  least one of resources and at least one of principal profiles  │
│                           908                                    │
└─────────────────────────────────────────────────────────────────┘
                              │
                              ▼
┌─────────────────────────────────────────────────────────────────┐
│  Enable device associated with organization to utilize API      │
│  configured to: apply, utilizing fourth data, first policy of   │
│  policies to set of resources of organization and set of        │
│  principal profiles of organization; and receive second policy  │
│  generated in association with organization to be included in   │
│  fourth data                                                     │
│                           910                                    │
└─────────────────────────────────────────────────────────────────┘
```

```
┌─────────────────────────────────────────────────────────────────────┐
│ Generate, utilizing account data associated with organization, voice│
│ interface application configured to enable voice interface for      │
│ device(s) associated with organization, voice interface application │
│ associated with organization identifier of organization, organization│
│ identifier associated with wireless network identifier of organization│
│                              1202                                    │
└─────────────────────────────────────────────────────────────────────┘
                                   │
                                   ▼
┌─────────────────────────────────────────────────────────────────────┐
│      Generate space identifiers associated with organization        │
│                           identifier                                 │
│                              1204                                    │
└─────────────────────────────────────────────────────────────────────┘
                                   │
                                   ▼
┌─────────────────────────────────────────────────────────────────────┐
│ Associate voice interface application with space identifiers based  │
│ at least in part on space identifiers being associated with         │
│                    organization identifier                          │
│                              1206                                    │
└─────────────────────────────────────────────────────────────────────┘
                                   │
                                   ▼
┌─────────────────────────────────────────────────────────────────────┐
│ Determine device identifier of device that is associated with at    │
│                     least one of space identifiers                  │
│                              1208                                    │
└─────────────────────────────────────────────────────────────────────┘
                                   │
                                   ▼
┌─────────────────────────────────────────────────────────────────────┐
│ Enable voice interface application for use by device based at least │
│ in part on device identifier being associated with at least one of  │
│                       space identifiers                             │
│                              1210                                    │
└─────────────────────────────────────────────────────────────────────┘
```

FIG. 12

INTEGRATION OF SPEECH PROCESSING FUNCTIONALITY WITH ORGANIZATION SYSTEMS

BACKGROUND

Devices, such as voice interface devices, may be associated with accounts. Account details associate the devices with functionality used by the devices. Described herein are improvements in technology and solutions to technical problems that can be used to, among other things, improve control of voice interface devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of another example process for integration of speech processing functionality with organization systems.

FIG. 12 illustrates a flow diagram of another examples process for associating a voice interface application with devices of an organization.

DETAILED DESCRIPTION

Figure 1A:
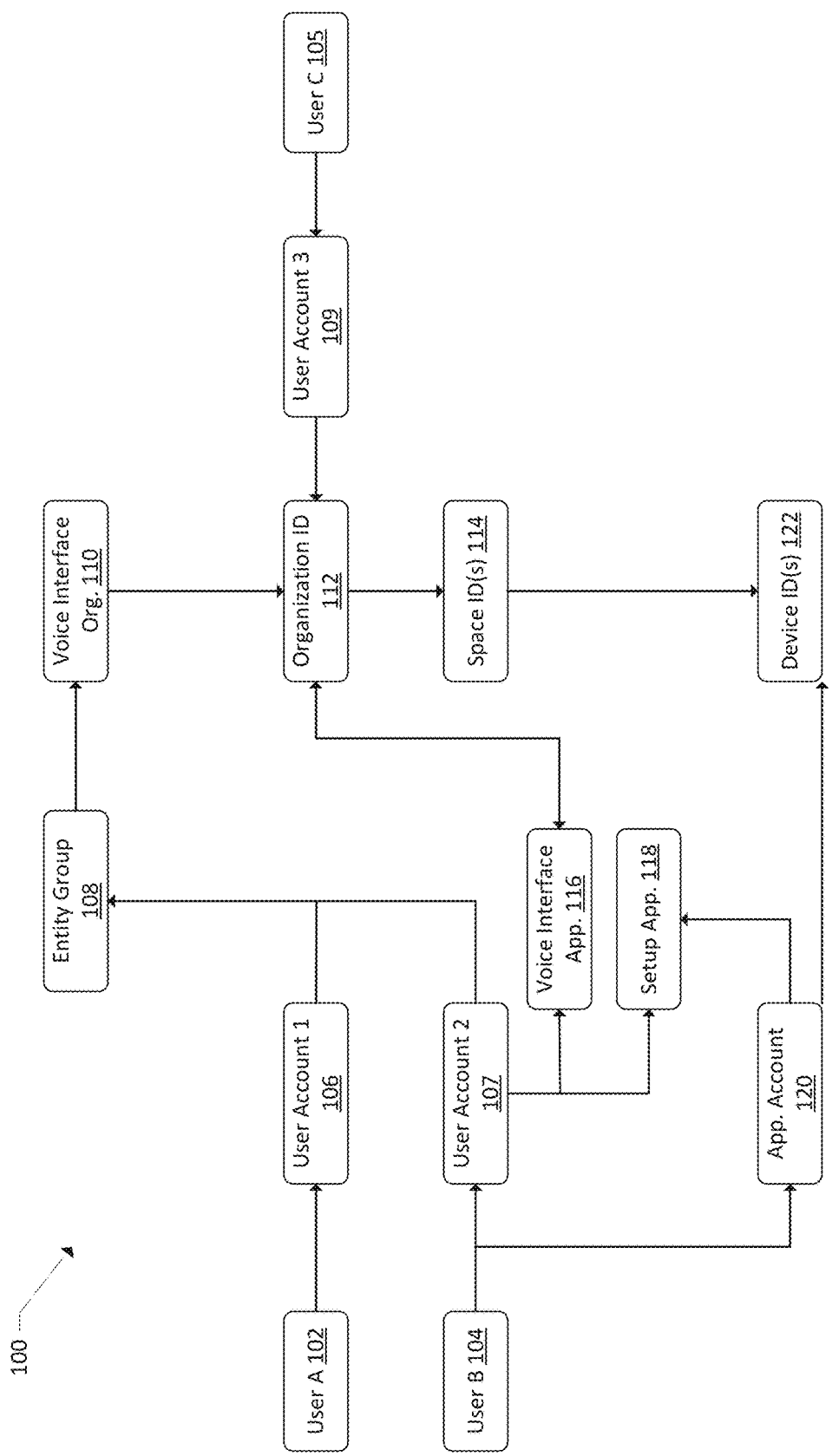
FIG. 1A illustrates a conceptual diagram of components of a system for integration of speech processing functionality with organization systems.

Systems and methods for integration of speech processing functionality with organization systems are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, Echo Show devices, steering wheels, laptops, kiosks, billboard, other devices with buttons, etc.). These electronic devices may be situated in a home, place a business, healthcare facility (e.g., hospital, pharmacy, etc.), vehicle (e.g., airplane, truck, car, bus, etc.), public forum (e.g., shopping center, store, etc.), for example.

In examples, various organizations may have dozens if not hundreds or thousands of electronic devices. Some residential users can have a few electronic devices or more. Regardless of the type of user, the growing number of devices introduces opportunity to innovate new technology to make it easier to set up, manage, and use electronic devices associated with user accounts. Typically, during an out-of-the-box experience, these organizations establish an account and associate devices to that account. The account may indicate the devices associated with the organization as well as functionality that has been enabled for use with the devices.

To allow for improved management and utilization of electronic devices in an organization, the techniques described herein include integrating a voice interface application created for an organization with the organization's system. For example, one or more user accounts may be generated in association with a speech processing system. The user accounts may be associated with permissions and/or access controls that allow for various functionalities to be performed. By way of example, some user accounts may be enabled to create other user accounts, to assign privileges to user accounts, and/or to develop voice interface applications, which may otherwise be described herein as "skills" and are described in more detail below, to be utilized by devices associated with the organization. In an example, a first user account associated with a first user may be utilized to generate a second user account associated with a second user. The second user account may be enabled to allow the second user to develop the voice interface application as described herein. The first user account may also be enabled to allow the first user to generate the voice interface application and/or to perform other functionality such as acting as an administrator for other accounts. The second user account may be enabled to create an application account with the speech processing system for the purpose of creating a customized voice interface application for the organization. The application account may be linked or otherwise associated with a setup application, which may provide tools and/or otherwise functionality to allow the second user to develop the voice interface application. Development of the voice interface application may include the designation of wake words to be detected from audio data representing user utterances, designation of one or more intents associated with the user utterances, actions to be performed in association with the intents, "payloads" associated with the intents, permissions and/or restrictions on use of the voice interface application, etc. The development of voice interface applications and speech processing utilizing voice interface applications is described in more detail with respect to FIG. 10, below.

Once the voice interface application is developed, the second user account and/or a third user account with appropriate permissions, may be enabled to generate space identifiers associated with spaces of the organization. Utilizing a hotel organization by way of example, the hotel organization may be associated with a building with three floors, each having 10 rooms and a common area. The user accounts may be utilized to generate space identifiers for each of the rooms, each of the common areas, and/or each of the floors, for example. These space identifiers may be associated with an organization identifier of the organization. In examples, device identifiers of voice enabled devices in the spaces may also be generated and associated with respective spaces. In other examples, device identifiers are not provided by user input, and instead wireless network access credentials, such as WiFi passwords and/or naming indicators, may be provided for the spaces.

Once the space identifiers are generated, the voice interface application may be enabled for use by devices associated with the organization identifier and the space identifiers. The voice enabled devices associated with the space identifier may then be associated with the voice interface application. For example, when device identifiers are not yet known, wireless network credentials may be utilized for associating device identifiers with the voice interface application. Utilizing the hotel organization example, all of the devices associated with the 30 rooms of the hotel and the common areas may utilize the same wireless network credentials to, for example, access the Internet. Since the wireless network credentials were associated with the space identifiers and/or the organization identifier, each of the devices that utilizes the wireless network credentials may be identified and may be determined to be devices that should be enabled for utilizing the voice interface application. The device identifiers may then be associated with the voice interface application, such that the voice interface application may be utilized to perform one or more actions in response to user utterances received at the devices of the organization.

For example, a user in one of the hotel rooms, utilizing the example above, may provide speech input to a device in the hotel room. The device may generate audio data representing the speech input and the audio data may be processed locally on the device and/or may be sent to a separate speech processing system. Because a device identifier of the device is indicated as being associated with the voice interface application, the voice interface application may be determined to be one application, potentially of several applications, that may be utilized to respond to the speech input. For example, the voice interface application may have been developed to handle user commands to order room service, checkout from the hotel, operate a smart device associated with a given room, and/or otherwise perform actions that are specific to the organization in question. Other applications that were not developed specifically for the organization in question may also be utilized, such as applications for determining the weather, outputting music, etc. As such, the audio data may be analyzed to determine intent data associated with the speech input. When the intent data indicates an intent that the custom voice interface application was configured to handle, the custom voice interface application may be called to service the intent. When the intent data indicates an intent that another application was configured to handle, that application may be called. When the custom voice interface application receives the intent data, the custom voice interface application may utilize the intent data to determine an action to be performed and/or a response to be provided to the user. For example, when a "room service" intent is determined, the custom voice interface application may be utilized to determine the food to be ordered and to generate a room service order for the food, which may be sent to a device associated with, for example, a kitchen of the hotel. The custom voice interface application may also determine a response to be output to the user, such as "your order has been placed."

Additionally, or alternatively, user profiles associated with the organization may be customizable to enable or disable use of the voice interface application for certain users in certain spaces. For example, instead of the voice interface application being enabled for devices associated with space identifiers alone, certain user profiles associated with certain users may be indicated to be authorized to utilize the voice interface application in association with certain space identifiers. For example, User Profile A may be authorized to utilize the voice interface application on any device associated with any space identifier of the organization. In other examples, User Profile B may be authorized to utilize the voice interface application on just devices associated with a certain space identifier and/or groups of space identifiers, while those same devices may be enabled to utilize the voice interface application when the user providing the speech input is associated with User Profile C.

Additionally, new devices may be associated with the voice interface application automatically and without a user input specifically requesting that the voice interface application be associated with the new devices. For example, during an out-of-the-box experience, a new device may be plugged in or otherwise powered on. The new device may identify a wireless network access point and may utilize wireless network credentials to become associated with the wireless network of devices. Once the new device is part of the wireless network of devices, it may be identified as being associated with a given space identifier and/or the organization identifier of the organization. Based at least in part on this association, the voice interface application may be associated with the new device such that speech input received at the new device may be serviced utilizing the voice interface application.

Additionally, the space identifiers may be grouped and groups of space identifiers may be assigned differing permissions for utilizing the voice interface application. For example, a first group of space identifiers may be enabled to allow devices associated with those space identifiers to utilize the voice interface application, while a second group of space identifiers may not be enabled to allow devices associated with those space identifiers to utilize the voice interface application, and/or to utilize a different voice interface application. This grouping of enabled space identifiers may be based at least in part on contextual information associated with the organization and/or the environment associated with the devices. For example, the voice interface application may be enabled for space identifiers indicated to be currently occupied and/or indicated to be associated with a room that has been checked into and/or indicated to be associated with a guest profile that has purchased the ability to utilize the voice interface application. Other environmental contexts may include determination of a certain time of day, day of the week, and/or occurrence of one or more trigger events, for example.

Additionally, one or more routines may be developed for devices associated with an organization. For example, a routine may include one or more commands for devices to perform one or more actions in response to a trigger event occurring. An example routine may be to turn off lights in a space at 10:00 pm every day. These routines may be developed by the user accounts described herein, and the routines may be associated with space identifiers. Devices associated with the selected space identifiers may be determined and commands may be sent to those devices to perform the actions indicated by the routines when the determined trigger events occur. By doing so, the specific devices associated with the space identifiers do not need to be selected for inclusion in the routine. Instead, the space identifiers may be utilized to select spaces where the routine is to be run, and the association between space identifiers and device identifiers, as well as the association between device identifiers and the voice interface application, may be utilized to identify the devices that will perform actions associated with the routines.

Additionally, a given organization may be associated with more than one wireless network of devices. For example, each floor of a hotel may be associated with its own wireless access point having its own wireless network credentials for associating devices with the network of devices. In these examples, user input data may be received that indicates a first group of space identifiers that are associated with a first network access point and a second group of space identifiers that are associated with a second network access point. Thereafter, a ranking of preferred network access points may be determined for given devices associated with the organization. For example, devices associated with the first group of space identifiers may be determined, and the first network access point may be prioritized over the second network access point for associating the devices in the first group of space identifiers with the network of devices. Devices associated with the second group of space identifiers may be determined, and the second network access point may be prioritized over the first network access point for associated these devices with the network of devices.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A illustrates a conceptual diagram of components of a system for integration of speech processing functionality with organization systems. One or more users, depicted as Users A-C 102, 104, 105 in FIG. 1A, may be configured to interact with the system. Additionally, one or more user accounts, depicted as User Account 1 106, User Account 2 107, and User Account 3 109, may be generated in association with a speech processing system. The user accounts 106, 107, 109 may be associated with permissions and/or access controls that allow for various functionalities to be performed. By way of example, User Account 1 106 may be enabled to create other user accounts, to assign privileges to user accounts, and/or to develop voice interface applications, which may otherwise be described herein as "skills," to be utilized by devices associated with the organization. User Account 1 106 may be associated with an entity group 108 and may be considered an administrator of the entity group 108. The entity group 108 may include a group of user accounts and/or entity identifiers that are associated with a voice interface organization 110. The voice interface organization may be an organization that is configured to make associations between organization identifiers and voice interface applications 116 as described herein. In an example, User Account 1 106 associated with User A 102 may be utilized to generate User Account 2 107 associated with User B 104. User Account 2 107 may be enabled to allow the User B 104 to develop the voice interface application 116 as described herein. In these examples, User Account 2 107 may be enabled to create an application account 120 with the speech processing system for the purpose of creating a customized voice interface application 116 for the organization. The application account 120 may be linked or otherwise associated with a setup application 118, which may provide tools and/or otherwise functionality to allow User B 104 to develop the voice interface application 116. Development of the voice interface application 116 may include the designation of wake words to be detected from audio data representing user utterances, designation of one or more intents associated with the user utterances, actions to be performed in association with the intents, "payloads" associated with the intents, permissions and/or restrictions on use of the voice interface application 116, etc. The development of voice interface applications and speech processing utilizing voice interface applications is described in more detail with respect to FIG. 10, below.

Once the voice interface application 116 is developed, User Account 2 107 and/or User Account 3 109 with appropriate permissions, may be enabled to generate space identifiers associated with spaces of the organization. Utilizing a hotel organization by way of example, the hotel organization may be associated with a building with three floors, each having 10 rooms and a common area. The user accounts may be utilized to generate space identifiers 114 for each of the rooms, each of the common areas, and/or each of the floors, for example. These space identifiers 114 may be associated with an organization identifier 112 of the organization. In examples, device identifiers of voice enabled devices in the spaces may also be generated and associated with respective spaces. In other examples, device identifiers are not provided by user input, and instead wireless network access credentials, such as WiFi passwords and/or naming indicators, may be provided for the spaces.

Once the space identifiers 114 are generated, the voice interface application 116 may be enabled for use by devices associated with the organization identifier 112 and the space identifiers 114. The voice enabled devices associated with the space identifiers 114 may then be associated with the voice interface application 116. For example, when device identifiers 122 are not yet known, wireless network credentials may be utilized for associating device identifiers 122 with the voice interface application 116. Utilizing the hotel organization example, all of the devices associated with the 30 rooms of the hotel and the common areas may utilize the same wireless network credentials to, for example, access the Internet. Since the wireless network credentials were associated with the space identifiers 114 and/or the organization identifier 112, each of the devices 122 that utilizes the wireless network credentials may be identified and may be determined to be devices that should be enabled for utilizing the voice interface application 116. The device identifiers 122 may then be associated with the voice interface application 116, such that the voice interface application 116 may be utilized to perform one or more actions in response to user utterances received at the devices of the organization.

For example, a user in one of the hotel rooms, utilizing the example above, may provide speech input to a device in the hotel room. The device may generate audio data representing the speech input and the audio data may be processed locally on the device and/or may be sent to a remote speech processing system. Because a device identifier 122 of the device is indicated as being associated with the voice interface application 116, the voice interface application 116 may be determined to be one application, potentially of several applications, that may be utilized to respond to the speech input. For example, the voice interface application 116 may have been developed to handle user commands to order room service, checkout from the hotel, operate a smart device associated with a given room, and/or otherwise perform actions that are specific to the organization in question. Other applications that were not developed specifically for the organization in question may also be utilized, such as applications for determining the weather, outputting music, etc. As such, the audio data may be analyzed to determine intent data associated with the speech input. When the intent data indicates an intent that the custom voice interface application 116 was configured to handle, the custom voice interface application 116 may be called to service the intent. When the intent data indicates an intent that another application was configured to handle, that application may be called. When the custom voice interface application 116 receives the intent data, the custom voice interface application 116 may utilize the intent data to determine an action to be performed and/or a response to be provided to the user. For example, when a "room service" intent is determined, the custom voice interface application 116 may be utilized to determine the food to be ordered and to generate a room service order for the food, which may be sent to a device associated with, for example, a kitchen of the hotel. The custom voice interface application 116 may also determine a response to be output to the user, such as "your order has been placed."

Additionally, or alternatively, user profiles associated with the organization may be customizable to enable or disable use of the voice interface application 116 for certain users in certain spaces. For example, instead of the voice interface application 116 being enabled for devices associated with space identifiers alone, certain user profiles associated with certain users may be indicated to be authorized to utilize the voice interface application 116 in association with certain space identifiers 114. For example, User A 102 may be authorized to utilize the voice interface application 116 on any device associated with any space identifier 114 of the organization. In other examples, User B 104 may be authorized to utilize the voice interface application 116 on just devices associated with a certain space identifier 114 and/or group of space identifiers 114, while those same devices may be enabled to utilize the voice interface application 116 when the user providing the speech input is User C 105.

Additionally, new devices may be associated with the voice interface application 116 automatically and without user input specifically requesting that the voice interface application 116 be associated with the new devices. For example, during an out-of-the-box experience, a new device may be plugged in or otherwise powered on. The new device may identify a wireless network access point and may utilize wireless network credentials to become associated with the wireless network of devices. Once the new device is part of the wireless network of devices, it may be identified as being associated with a given space identifier 114 and/or the organization identifier 112 of the organization. Based at least in part on this association, the voice interface application 116 may be associated with the new device such that speech input received at the new device may be serviced utilizing the voice interface application 116.

Additionally, the space identifiers 114 may be grouped and groups of space identifiers 114 may be assigned differing permissions for utilizing the voice interface application 116. For example, a first group of space identifiers 114 may be enabled to allow devices associated with those space identifiers 114 to utilize the voice interface application 116, while a second group of space identifiers 114 may not be enabled to allow devices associated with those space identifiers 114 to utilize the voice interface application 116, and/or to utilize a different voice interface application. This grouping of enabled space identifiers 114 may be based at least in part on contextual information associated with the organization and/or the environment associated with the devices. For example, the voice interface application 116 may be enabled for space identifiers 114 indicated to be currently occupied and/or indicated to be associated with a room that has been checked into and/or indicated to be associated with a guest profile that has purchased the ability to utilize the voice interface application 116. Other environmental contexts may include determination of a certain time of day, day of the week, and/or occurrence of one or more trigger events.

Additionally, one or more routines may be developed for devices associated with an organization. For example, a routine may include one or more commands for devices to perform one or more actions in response to a trigger event occurring. An example routine may be to turn off lights in a space at 10:00 pm every day. These routines may be developed by the user accounts described herein, and the routines may be associated with space identifiers 114. Devices associated with the selected space identifiers 114 may be determined and commands may be sent to those devices to perform the actions indicated by the routines when the determined trigger events occur. By doing so, the specific devices associated with the space identifiers 114 do not need to be selected for inclusion in the routine. Instead, the space identifiers 114 may be utilized to select spaces where the routine is to be run, and the association between space identifiers 114 and device identifiers 122, as well as the association between device identifiers 122 and the voice interface application 116, may be utilized to identify the devices that will perform actions associated with the routines.

Additionally, a given organization may be associated with more than one wireless network of devices. For example, each floor of a hotel may be associated with its own wireless access point having its own wireless network credentials for associating devices with the network of devices. In these examples, user input data may be received that indicates a first group of space identifiers 114 that are associated with a first network access point and a second group of space identifiers 114 that are associated with a second network access point. Thereafter, a ranking of preferred network access points may be determined for given devices associated with the organization. For example, devices associated with the first group of space identifiers 114 may be determined, and the first network access point may be prioritized over the second network access point for associating the devices in the first group of space identifiers 114 with the network of devices. Devices associated with the second group of space identifiers 114 may be determined, and the second network access point may be prioritized over the first network access point for associated these devices with the network of devices.

Figure 1B:
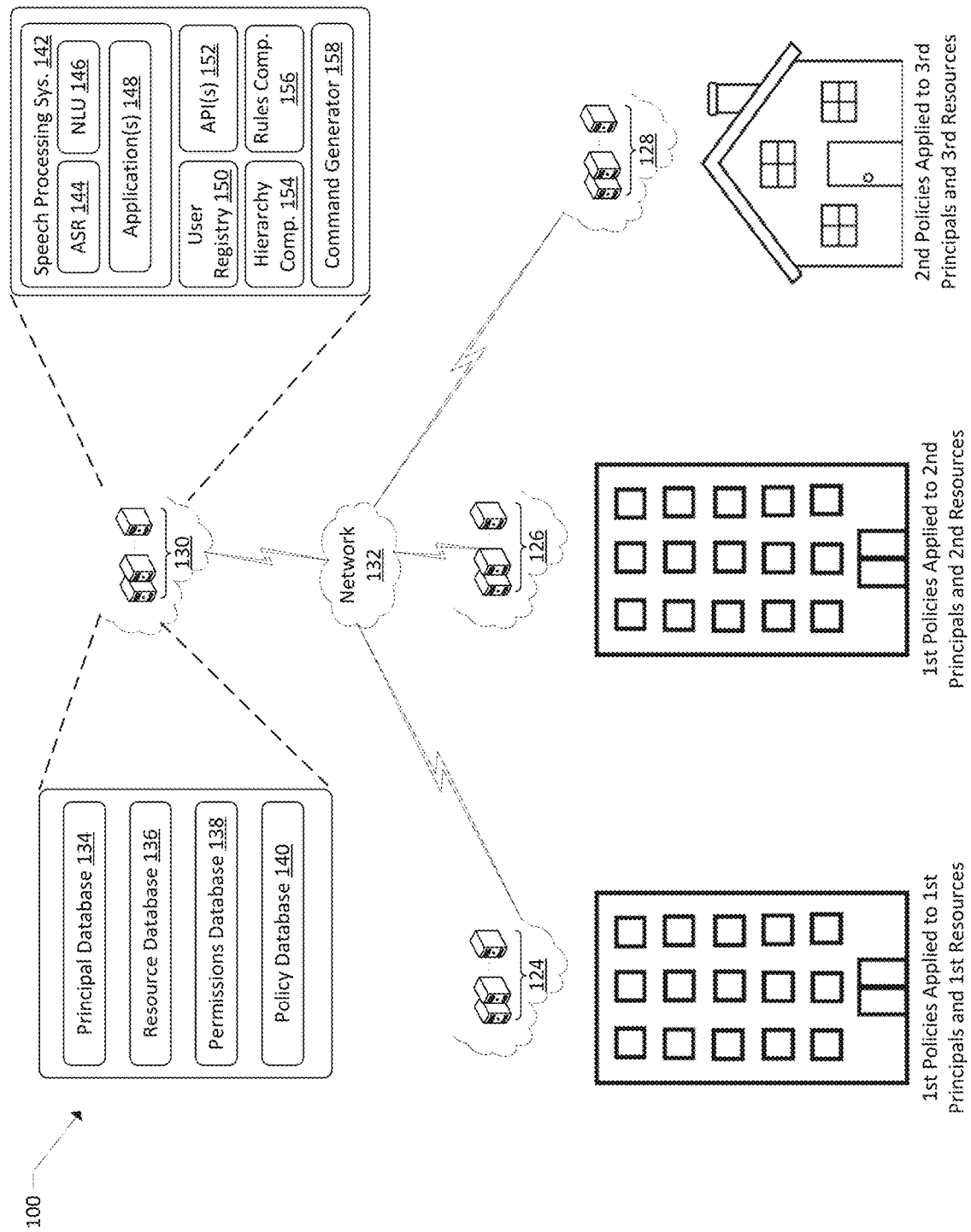
FIG. 1B illustrates a schematic diagram of an example environment for integration of speech processing functionality with organization systems.

FIG. 1B illustrates a schematic diagram of an example system 100 for integration of speech processing functionality with organization systems. The system 100 may include, for example, one or more organization systems 124-128. Each of these organization systems 124-128 may be associated with an organization having a number of entities and devices. The devices, which may be described generally as electronic devices and/or resources and may include a communal device and/or a personal device. In certain examples, the devices may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The devices may be configured to send data to and/or receive data from a system 130, such as via a network 132. It should be understood that where operations are described herein as being performed by the system 130, some or all of those operations may be performed by the devices. It should also be understood that anytime the system 130 is referenced, that system may include any system and/or device, whether local to an environment of the devices or remote from that environment. Additionally, it should be understood that a given space and/or environment may include numerous electronic devices. It should also be understood that when a "space" or "environment" is used herein, those terms mean an area and not necessarily a given room, building, or other structure, unless otherwise specifically described as such.

The devices may include one or more components, such as, for example, one or more processors, one or more network interfaces, memory, one or more microphones, one or more speakers, one or more displays, and/or one or more sensors. The microphones may be configured to capture audio, such as user utterances, and generate corresponding audio data. The speakers may be configured to output audio, such as audio corresponding to audio data received from another device and/or the system 130. The displays may be configured to display images corresponding to image data, such as image data received from the system 130 and/or one or more other devices. The sensors may include any component configured to detect an environmental condition associated with the devices and/or the environment associated with the devices. Some example sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the device, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. The devices may include device functionality that the devices are configured to utilize. The device functionality may include any functionality that a device may performed when commanded to do so.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 132 and to communicate with other devices in the system. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 130 may include components such as, for example, a speech processing system 142, a user registry 150, one or more APIs 152, a hierarchy component 154, a rules component 156, and/or a command generator 158. It should be understood that while the components of the system 130 are depicted and/or described as separate from each other in FIG. 1B, some or all of the components may be a part of the same system. The speech-processing system 116 may include an automatic speech recognition component (ASR) 144 and/or a natural language understanding component (NLU) 146. Each of the components described herein with respect to the system 130 may be associated with their own systems, which collectively may be referred to herein as the system 130, and/or some or all of the components may be associated with a single system. Additionally, the system 130 may include one or more applications 148, which may be similar to the custom voice interface application 116 described herein, and may be described as skills. "Skills," as described herein may be applications 148 and/or may be a subset of an application 148. For example, a skill may receive data representing an intent. For example, an intent may be determined by the NLU component 146 and/or as determined from user input via a computing device. Skills may be configured to utilize the intent to output data for input to a text-to-speech component, a link or other resource locator for audio data, and/or a command to a device, such as the devices described herein. "Skills" may include applications 148 running on devices, such as the devices, and/or may include portions that interface with voice user interfaces of devices.

In instances where a voice-enabled device is utilized, skills may extend the functionality of devices that can be controlled by users utilizing a voice-user interface. In some examples, skills may be a type of application 148 that may be useable in association with accessory devices and may have been developed specifically to work in connection with given accessory devices. Additionally, skills may be a type of application 148 that may be useable in association with the voice-enabled device and may have been developed specifically to provide given functionality to the voice-enabled device. In examples, a non-skill application may be an application 148 that does not include the functionality of a skill. Speechlets, as described herein, may be a type of application 148 that may be usable in association with voice-enabled devices and may have been developed specifically to work in connection with voice interfaces of voice-enabled devices. The application(s) 148 may be configured to cause processor(s) to receive information associated with interactions with the voice-enabled device. The application(s) 148 may also be utilized, in examples, to receive input, such as from a user of a personal device and/or the voice-enabled device and send data and/or instructions associated with the input to one or more other devices.

The components of the system 130 are described in detail below. In examples, some or each of the components of the system 130 may include their own processor(s), network interface(s), and/or memory. As such, by way of example, the speech processing system 142 may include and/or be associated with processor(s), network interface(s), and/or memory. The other components of the system 130, such as the command generator 158, may include and/or be associated with different processor(s), network interface(s), and/or memory, or one or more of these components may utilize some or all of the same processor(s), network interface(s), and/or memory utilized by the speech processing system 142. These components are described in detail below. Additionally, the operations and/or functionalities associated with and/or described with respect to the components of the system 130 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the components of the system 130, the user registry 150 may be configured to determine and/or generate associations between users, user accounts, and/or devices. The user registry 150 may also include principal identifiers, resource identifiers, and/or indications of policies as described herein. One or more associations between user accounts may be identified, determined, and/or generated by the user registry 150. The user registry 150 may additionally store information indicating one or more applications and/or resources accessible to and/or enabled for a given user account. Additionally, the user registry 150 may include information indicating device identifiers, such as naming identifiers, associated with a given user account, as well as device types associated with the device identifiers. The user registry 150 may also include information indicating user account identifiers, naming indicators of devices associated with user accounts, and/or associations between devices, such as the devices. The user registry 150 may also include information associated with usage of the devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the system may be stored or otherwise associated with an account identifier. Data associated with the user accounts may include, for example, account access information, historical usage data, device-association data, and/or preference data.

The speech-processing system 142 may be configured to receive audio data from the devices and/or other devices and perform speech-processing operations. For example, the ASR component 144 may be configured to generate text data corresponding to the audio data, and the NLU component 146 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "access Data A," the NLU component 146 may identify an "access data" intent and the payload may be "Data A." In this example where the intent data indicates an intent to display content associated with Data A, the speech-processing system 142 may call one or more speechlets to effectuate the intent. Speechlets, as described herein may otherwise be described as the applications 148 and may include functionality for utilizing intent data to generate directives and/or instructions. For example, a customer service speechlet may be called when the intent indicates that Data A is to be utilized for customer troubleshooting. The speechlet may be designated as being configured to handle the intent of identifying and providing Data A, for example. The speechlet may receive the intent data and/or other data associated with the user utterance from the NLU component 146, such as by an orchestrator of the system 130, and may perform operations to instruct the devices to output the content, for example. The system 130 may generate audio data confirming that requested content has been provided, such as by a text-to-speech component. The data may be sent from the system 130 to the devices.

The components of the system 100 are described below by way of example.

To allow for improved management and utilization of electronic devices in an organization, the techniques described herein include a policy-based process of establishing, managing, and utilizing permissions for the operation of devices. For example, an administration component of the system 130 associated with at least some of the electronic devices, such as voice interface devices, may maintain a principal database 134, a resource database 136, a permissions database 138, and/or a policy database 140. The principal database 134 may include principal identifiers of entities associated with the system 130. Utilizing the example provided above, an organization, such as an organization associated with the organization system 124 with 100 employees may result in 100 principal identifiers that are mapped to the employees. The resource database 136 may include resource identifiers of devices associated with the system 130. Again utilizing the example provided above, an organization system 124 may have 100 electronic devices that may communicate with the system 130, either directly or indirectly, and may result in 100 resource identifiers. The principal profiles and/or resources of one or more other organizations may also be stored in the principal database 134 and/or resource database 136 of the administration component. The permissions database 138 may include identifier of permissions that may be applied to use of resources by principal profiles. The policy database 140 may include data representing one or more policies for the use of resources by principal profiles. For example, one or more permissions may be generated and applied to the use of resources by principal profiles. Example permissions may include, for example, unrestricted use of the resources, limitations on resource use, permitted applications to be used, contextual information that may be required for use of the resources, conditions on resource use, and/or other permissions. For any given resource, one or more policies may apply that indicate permissions and principal profiles associated with use of that resource.

To generate and/or apply the policies described herein, one or more of the APIs 152 may be provided to the organizations. The APIs 152 may define interactions between software applications of the systems 124-(c) and applications 122 of the system 130. For example, the APIs 152 may be utilized to receive data associated with entities of an given organization, such as employees. The organization-related system 124-128 may store information about its employees, such as in an employee database. The employee information may include user identifiers, titles and/or positions, managerial responsibilities, administrative responsibility, etc. The APIs 152 may be utilized to acquire this information and create principal identifiers for some or all of the organization entities. These principal identifiers may be stored in the principal database 134. The organization-related system 124-128 may also store information about devices associated with the organization, such as voice interface devices and/or other devices that are configured to be operated utilizing the voice interface applications. The APIs 152 may be utilized to acquire this device information and create resource identifiers for some or all of the organization devices. These resource identifiers may be stored in the resource database 136. The APIs 152 may also be utilized to acquire information about the organization, such as an organization type, a geographic location of the organization, and/or any other information about the organization.

The APIs 152 may also be utilized to send data indicating preexisting policies and/or permissions that may be applied to the organization's principal profiles and resources. For example, the system 130 and/or another organization may have already developed policies that have been previously applied to other principal profiles and resources. Indicators of these policies and/or permissions may be presented utilizing a user interface. In these examples, a user associated with the organization system 124-128 may select one or more of the permissions and/or policies to apply to given principal profiles and given resources of the organization. In examples, the system 130 may determine which policies and/or permissions to present via the user interface based at least in part on the organization type of the organization, the number of principal profiles associated with the organization, the number and/or type of resources associated with the organization, etc. User input data may be received via the user interface indicating selection of a given permission and/or policy and the system 130 may utilize that user input data to generate a policy to be applied to use of the organization's principal profiles and resources. For example, the user may select a group of principal profiles and indicate permissions that may apply to use of a group of resources by that group of principal profiles. A policy may be generated indicating this permitted use. In some examples, default policies may be applied to use of an organization's resources by its principal profiles. These default policies may be based at least in part on the organization type, resource type, etc. By so doing, use of individual resources by individual principal profiles of an organization may be customized without the need to establish an account for each principal and manipulate each account to indicate permitted and unpermitted use of each individual resource. The APIs 152 may also be utilized to allow a user to generate personalized policies. For example, if one or more of the preexisting policies does not meet the user's needs, the APIs 152 may be configured to receive input data indicating a permission to be applied to use of a resource by a principal. The system 130 may generate a corresponding policy and store that policy in the policy database. Thereafter, the policy and/or related permission may be made available to other users of the system 130.

Additionally, the hierarchy component 154 may be configured to assist in applying policies to different principal levels and/or resource levels. For example, a given organization may have 5 administrators, 20 managers, 100 senior employees, and 200 junior employees. Instead of indicating and/or generating policies for each of these employees, the hierarchy component 154 may be utilized to identify principal levels and apply policies to principal profiles based at least in part on those principal levels. For example, the 5 administrators may be associated with a first principal level having unrestricted access to use of all resources of the organization. The 20 managers may be associated with a second principal level having more limited use of all of the resources. The 100 senior employees may be associated with a third principal level having even more limited use of only certain resources. The 200 junior employees may have even more limited use of only those resources specifically associated with a given junior employee.

Additionally, the rules component 156 may be utilized to apply default policies when a new functionality is developed for a group of resources. For example, developers may periodically or otherwise develop new functionalities that may be utilized by certain resources. The rules component 156 may determine the resource identifiers corresponding to resources across multiple organizations that are associated with the new functionality. Additionally, in examples, the developer of the new functionality may indicate whether the functionality should be enabled automatically without user input or whether the functionality should be disabled until specifically requested to be enabled by a user of a given organization. The rules component 130 may utilize this input and enable and/or disable the functionality as indicated. When the default policy is to disable the functionality, the system 130 may notify a user(s) associated with the resources at issue that the functionality is available. By so doing, regardless of a domain associated with the new functionality, such as whether the functionality was developed for enterprise use or residential use, the new functionality may be made available to all domains without the need for account-based authorization.

Once policies have been applied to use of resources by principal profiles as described herein, the policies may be utilized in runtime scenarios to permit or restrict use as indicated by the policies. For example, audio data representing a user utterance may be received from a voice interface device associated with a given organization system 124-128). The audio data may be analyzed to determine a requested operation to be performed by a given resource. The system 130 may determine the principal identifier associated with the audio data and the resource identifier associated with the resource. Policies associated with the resource identifier may be queried from the policy database 140, and the system 130 may be configured to determine whether the requested operation is permitted to be performed by the principal and for the resource. When the operation is permitted, the command generator 158 may generate and send a command to the voice interface device to cause the operation to be performed. When the policy indicates that the principal is not permitted to perform the operation utilizing the resource, the system 130 may send an indication that the operation is not permitted, and in examples the voice interface device may output audio indicating the requested operation has not been performed and/or that the principal is not permitted to perform the operation.

In certain examples, machine learning may be utilized to identify policies and/or to generate policies and/or other rules associated with the processes described herein. In these instance, machine learning models may be utilized. The machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

It should be noted that while text data is described as a type of data utilized to communicate between various components of the system 130 and/or other systems and/or devices, the components of the system 130 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices.

As shown in FIG. 1B, several of the components of the system 130 and the associated functionality of those components as described herein may be performed by one or more of the resources described herein. Additionally, or alternatively, some or all of the components and/or functionalities associated with the resources may be performed by the system 130.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) described with respect to the components of the resources and/or the processor(s) described with respect to the components of the system 130, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) described with respect to the components of the resources and/or the processor(s) described with respect to the components of the system 130 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 130 may possess its own local memory, which also may store program components, program data, and/or one or more operating systems.

The memory described with respect to the components of the resources and/or the memory described with respect to the components of the system 130 may include volatile and nonvolatile memory, removable and non-removable media implemented in any method or technology for storage of information, such as computer-readable instructions, data structures, program component, or other data. Such memory described with respect to the components of the resources and/or the memory described with respect to the components of the system 130 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory described with respect to the components of the resources and/or the memory described with respect to the components of the system 130 may be implemented as computer-readable storage media ("CRSM"), which may be any available physical media accessible by the processor(s) described with respect to the components of the resources and/or the processor(s) described with respect to the system 130 to execute instructions stored on the memory described with respect to the components of the resources and/or the memory described with respect to the components of the system 130. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory described with respect to the components of the resources and/or the memory described with respect to the components of the system 130, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) described with respect to the components of the resources and/or the network interface(s) described with respect to the components of the system 130 may enable messages between the components and/or devices shown in system 100 and/or with one or more other polling systems, as well as other networked devices. Such network interface(s) described with respect to the components of the resources and/or the network interface(s) described with respect to the components of the system 130 may include one or more network interface controllers (NICs) or other types of transceiver devices to send and receive messages over the network 132.

For instance, each of the network interface(s) described with respect to the components of the resources and/or the network interface(s) described with respect to the components of the system 130 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) described with respect to the components of the resources and/or the network interface(s) described with respect to the components of the system 130 may include a wide area network (WAN) component to enable message over a wide area network.

In some instances, the system 130 may be local to an environment associated the devices. For instance, the system 130 may be located within one or more of the devices. In some instances, some or all of the functionality of the system 130 may be performed by one or more of the devices. Also, while various components of the system 130 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
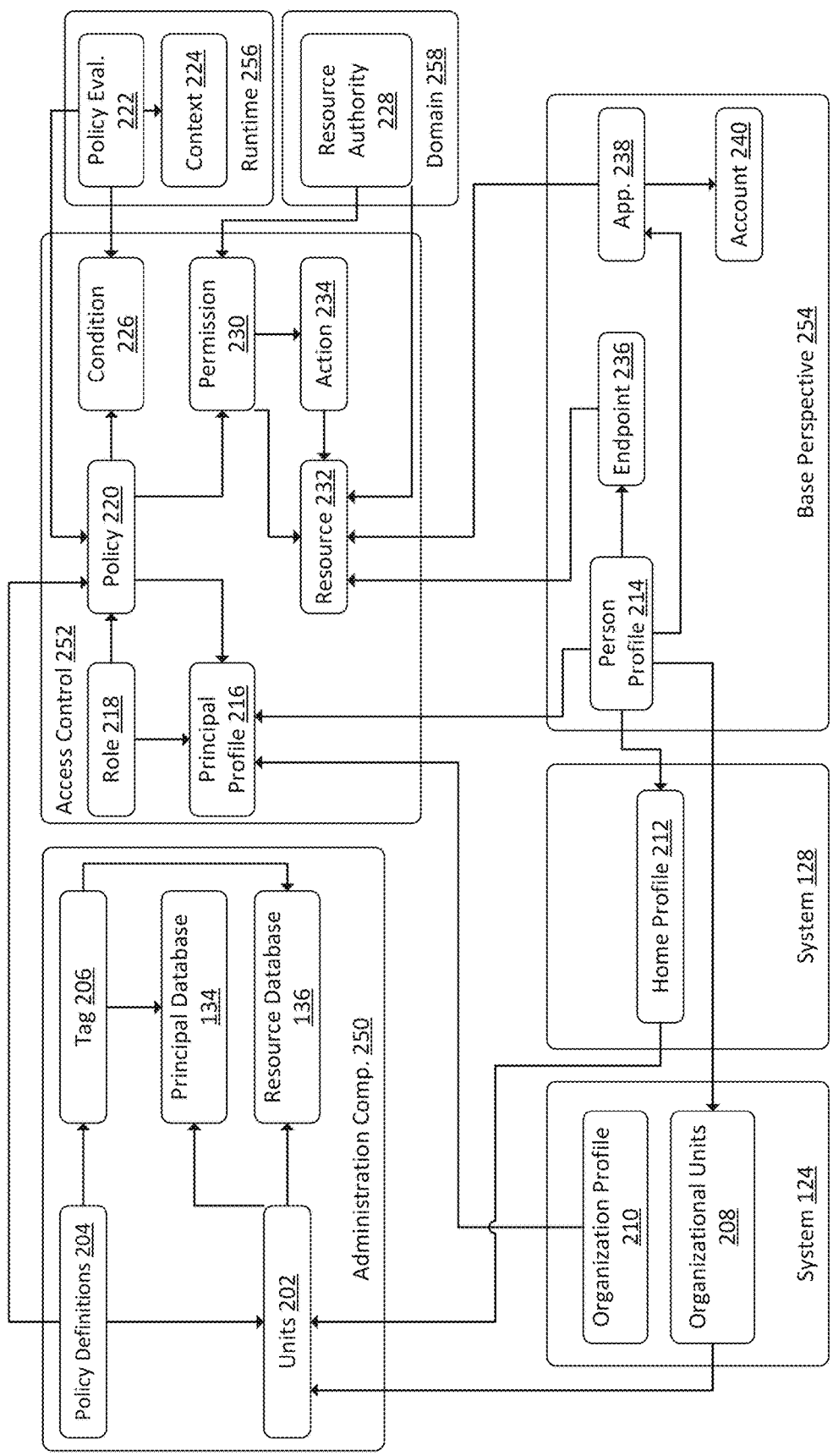
FIG. 2 illustrates a conceptual diagram of data and components utilized for integration of speech processing functionality with organization systems.

FIG. 2 illustrates a conceptual diagram of data and components utilized for integration of speech processing functionality with systems. FIG. 2 provides an example process for generating and/or selecting policies to apply to given principal profiles for use of given resources. It should be understood that while FIG. 2 is described in a sequential process by way of example, the operations described herein may be performed in a different order and/or in parallel. FIG. 2 includes some of the components described with respect to FIG. 1B, such as a principal database 134 and/or a resource database 136. These components may function in the same or a similar manner as described with respect to FIG. 1B.

Initially, generation and/or selection of given policies to apply to given principal profiles and resources may be performed. Thereafter, use of access controls during runtime may utilize the policies to determine whether given requests to perform actions are permitted. To start, an administration component 250 may include the principal database 134, the resource database 136, units 202, a policy definition 204, and/or one or more tags 206. As described more fully herein, one or more APIs may be utilized to acquire information about entities and/or devices associated with given organizations. As shown in FIG. 2, a first system 124 may include organization units 208, which may be described as entities associated with the first system 124. The entities may include employees, contractors, groups, environment indicators and/or any other identifier of someone or something associated with the first system 124. Entity identifiers may be obtained utilizing the APIs described herein, and those entity identifiers may be associated with units 202 in the administration component 250. Principal identifiers associated with the units 202 may be stored in the principal database 134. Additionally, device identifiers may be received from the first system 124 and stored as resources in the resource database 136. The same or a similar process may be performed with respect to the system 128. In this example, system 128 may be associated with a residential example, where the entities may include users residing in the environment and/or rooms of the environment and/or groups associated with the environment, for example. In this example, a home component 212 may be configured to be queried for the entity and device information as described herein.

The APIs may also be utilized to send data indicating preexisting policies and/or permissions that may be applied to the organization's principal profiles and resources. For example, the system and/or another organization may have already developed policies that have been previously applied to other principal profiles and resources. Indicators of these policies and/or permissions may be presented utilizing a user interface. In these examples, a user associated with the organization may select one or more of the permissions and/or policies to apply to given principal profiles and given resources of the organization. In examples, the remote system may determine which policies and/or permissions to present via the user interface based at least in part on the organization type of the organization, the number of principal profiles associated with the organization, the number and/or type of resources associated with the organization, etc. User input data may be received via the user interface indicating selection of a given permission and/or policy, and the remote system may utilize that user input data to generate a policy to be applied to use of the organization's principal profiles and resources. For example, the user may select a group of principal profiles and indicate permissions that may apply to use of a group of resources by that group of principal profiles. A policy may be generated indicating this permitted use. In some examples, default policies may be applied to use of an organization's resources by its principal profiles. These default policies may be based at least in part on the organization type, resource type, etc. By so doing, use of individual resources by individual principal profiles of an organization may be customized without the need to establish an account for each principal and manipulate each account to indicate permitted and unpermitted use of each individual resource. The APIs may also be utilized to allow a user to generate personalized policies. For example, if one or more of the preexisting policies does not meet the user's needs, the APIs may be configured to receive input data indicating a permission to be applied to use of a resource by a principal. The remote system may generate a corresponding policy and store that policy in the policy database. Thereafter, the policy and/or related permission may be made available to other users of the remote system.

As shown in FIG. 2, one or more tags 206 may be applied to given principal profiles and/or resources. The tags 206 may include identifiers of conditions and/or contextual information associated with the principal profiles and/or resources. Examples of tags 206 may include indicators of permissions associated with the principal profiles and/or resources, device types of the resources, organization type of the related organization, contextual information related to the principal profiles and/or resources, and/or any other information that may be utilized to assist in searching for principal profiles and/or resources and/or determining information related to the principal profiles and/or resources.

In a runtime scenario, an access control component 252 may be called to determine whether a request to perform an action by a given principal on a given resource is permitted pursuant to one or more policies. For example, a request to perform an action on a resource may be received. In the example of FIG. 2, the request may be from the organization 210 of the first system 124 and/or from a person identifier 214 from another system, such as a base perspective system 254. The base perspective system 254 may be described as a system that is not designated as specifically an enterprise or business system or specifically as a residential system. The access control component 252 may receive the request data and may identify a principal profile 216 associated with the request. A role component 218 may be configured to identify a role or otherwise an indicator of title and/or permission access level associated with the principal. The access control component 252 may then determine a policy 220 that has been applied to the principal, and in examples the role associated with the principal. A runtime component 256 may include a policy evaluation component 222, which may be configured to evaluate the policy 220 at issue and determine whether one or more conditions to permit use of the resource by the principal should be applied. To do so, the policy evaluation component 22 may query context data 224 to determine if the permissions associated with the policy indicate that a given context is required for permitting use of the resource by the principal. The policy evaluation component 220 may send data indicating one or more conditions 226 to apply to the policy based on the determinations made by the policy evaluation component 220. A domain 258 may also be queried to determine permissions associated with the resource in question. For example, a resource authority 228 may utilize an identifier of the resource at issue and/or the resource type of the resource to determine whether permissions 230 are to be applied to use of the resource. The permissions 230 may be in addition to or instead of permissions indicated by the policy 220 at issue.

The access control component 252, now having information indicating the principal profile 216, the policy 220, the permissions 230, and/or the conditions 226, may determine whether the requested action is permitted. For example, if the policy 220, the permission 230, and/or the conditions 226 indicate that the principal profile 216 may operate the resource 232, then an action 234 may be determined corresponding to operation of the resource 232. The action 234 may include a command that may be sent to a device endpoint 236 for causing the action 234 to be performed. Information associated with the action 234 may also be sent to an application 238 associated with the resource and/or the organization system at issue. In examples where the application 238 is registered or otherwise associated with an account 240, data indicating the action 234 that was performed may be sent to the account 240. By utilizing the system described with respect to FIG. 2, policies may be generated for the use of resources by principal profiles without the need for accounts. During runtime scenarios, the policies and associated conditions and permissions may be checked and applied to ensure authorized use of resources by principal profiles.

Figure 3:
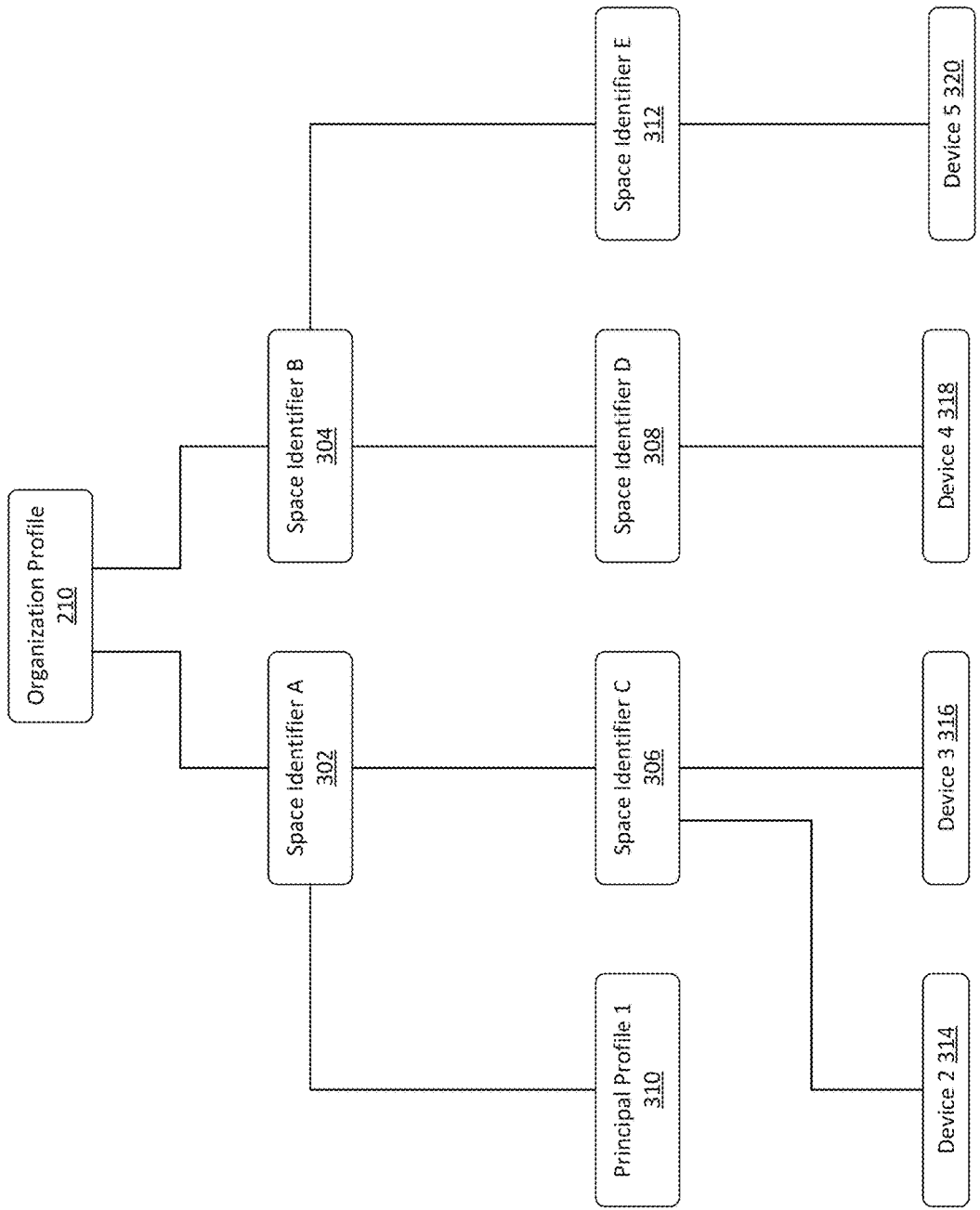
FIG. 3 illustrates a conceptual diagram of organizations, units, and resources associated with integration of speech processing functionality.

FIG. 3 illustrates a conceptual diagram of organization profiles, units, and resources associated with integration of speech processing functionality. FIG. 3 includes an example of an organization profile 210, which may be the same as or similar to the organization profile described with the respect to FIG. 2. Additionally, FIG. 3 illustrates that the organization profile 210 is associated with Principal Profiles 1 310. However, it should be understood that any number of principal profiles may be associated with a given organization profile. Additionally, FIG. 3 illustrates that the organization profile 210 is associated with Space Identifiers A-E 302-308, 312. However, it should be understood that any number of space identifiers may be associated with a given organization profile.

FIG. 3 also illustrates a hierarchy of principal profiles and space identifiers for a given organization profile. For example, a hierarchy component may be configured to assist in applying policies to different principal levels and/or space identifier levels. For example, organization profile 210 may include a first hierarchy level that includes Space Identifier A 302 and Space Identifier 304. These space identifiers may be associated with other space identifiers and/or principal profiles. For example, Space Identifier A 302 may be associated with Principal Profile 310 and Space Identifier C 306. Space Identifier B 304 may be associated with Space Identifiers D and E 308, 312. Additionally, some or all of the space identifiers may be associated with various devices. For example, Space Identifier C 306 may be associated with Devices 2 and 3 314, 316, Space Identifier D 308 may be associated with Device 4 318, and Space Identifier E 312 may be associated with Device 5 320.

By so doing, the space identifiers associated with an organization profile 210 may be nested, or other associated with each other and/or with principal profiles. This may allow for user account data to be utilized to designate which spaces are to be associated with a custom voice interface application, and those space identifiers, principal profiles, and devices in lower levels of the hierarchy may be associated with the voice interface application without a need to receive user input as to each of the space identifiers, principal profiles, and/or devices.

Figure 4:
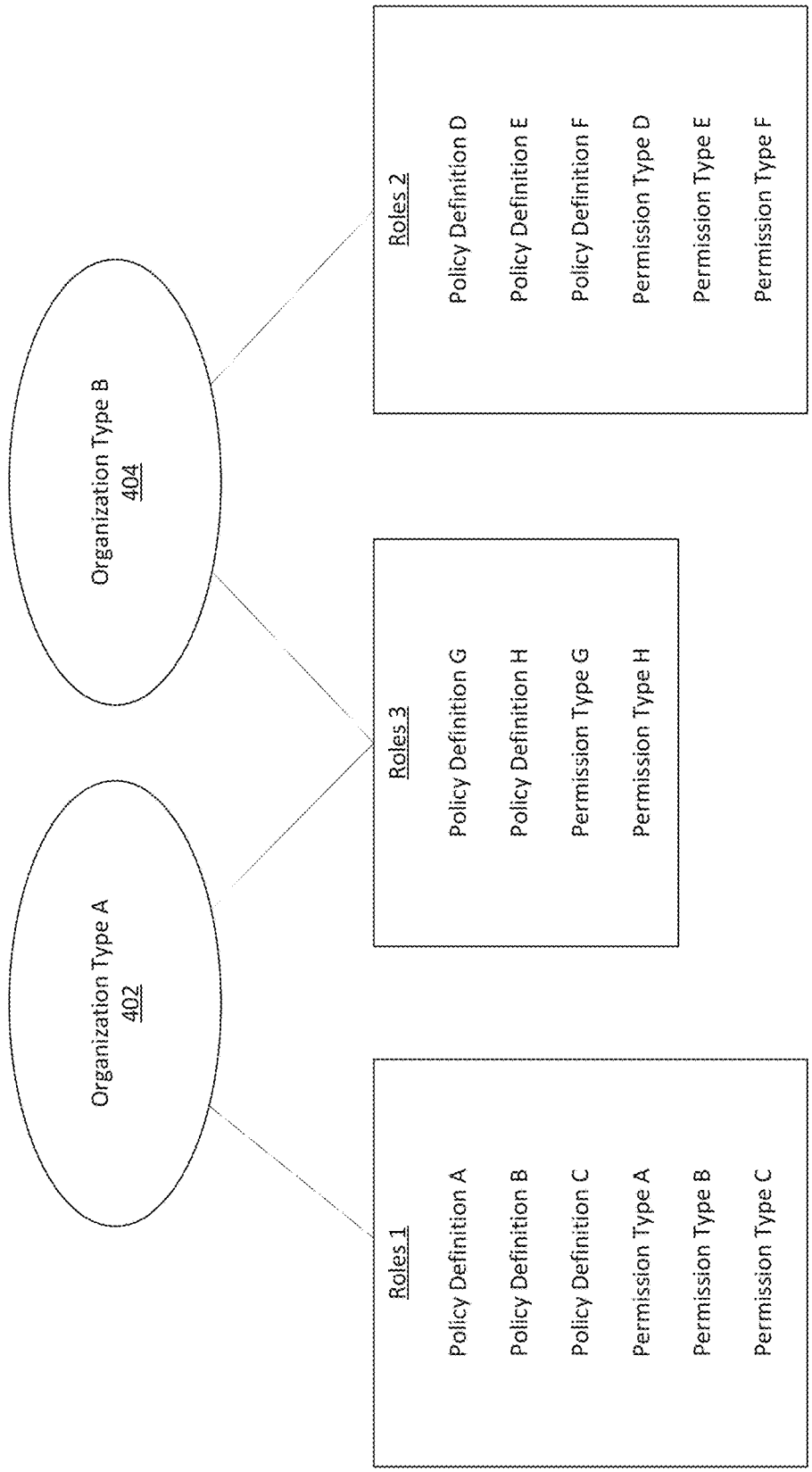
FIG. 4 illustrates a conceptual diagram of policies associated with various organization types.

FIG. 4 illustrates a conceptual diagram of policies associated with various organization types. FIG. 4 shows two organization types, Organization Type A 402 and Organization Type B 404. It should be understood that the organization types may include one, two, or more than two organization types. Also, the organization types may include, by way of example and not as a limitation, categories such as enterprise versus residential, and/or subcategories such as hospitality, manufacturing, healthcare, etc.

The APIs described herein may be utilized to send data indicating preexisting policies and/or permissions that may be applied to the organization's principal profiles and resources. For example, the remote system and/or another organization may have already developed policies that have been previously applied to other principal profiles and resources. Indicators of these policies and/or permissions may be presented utilizing a user interface. In these examples, a user associated with the organization may select one or more of the permissions and/or policies to apply to given principal profiles and given resources of the organization. In examples, the remote system may determine which policies and/or permissions to present via the user interface based at least in part on the organization type of the organization, the number of principal profiles associated with the organization, the number and/or type of resources associated with the organization, etc. A shown in FIG. 4, Organization Type A 402 may be associated with a first group of roles, Roles 1, illustrated as Policy Definitions A-C and Permission Types A-C. Organization Type B 404 may be associated with a second group of roles, Roles 2, illustrated as Policy Definitions D-F and Permission Types D-F. In addition to policies and permissions that are specific to given organization types, some policies and/or permissions may be associated with multiple organization types and/or may be universal to organizations regardless of organization type. For example, Policy Definitions D and H and Permissions G and H, indicated as Roles 3, may be associated with both Organization Type A 402 and Organization Type B 404.

User input data may be received via the user interface indicating selection of a given permission and/or policy and the remote system may utilize that user input data to generate a policy to be applied to use of the organization's principal profiles and resources. For example, the user may select a group of principal profiles and indicate permissions that may apply to use of a group of resources by that group of principal profiles. A policy may be generated indicating this permitted use. In some examples, default policies may be applied to use of an organization's resources by its principal profiles. These default policies may be based at least in part on the organization type, resource type, etc. By so doing, use of individual resources by individual principal profiles of an organization may be customized without the need to establish an account for each principal and manipulate each account to indicate permitted and unpermitted use of each individual resource. The APIs may also be utilized to allow a user to generate personalized policies. For example, if one or more of the preexisting policies does not meet the user's needs, the APIs may be configured to receive input data indicating a permission to be applied to use of a resource by a principal. The remote system may generate a corresponding policy and store that policy in the policy database. Thereafter, the policy and/or related permission may be made available to other users of the remote system.

FIGS. 5-9 illustrates processes for integration of speech processing functionality with organization systems. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1A-4 and 10-13E, although the processes may be implemented in a wide variety of other environments, architectures and systems.

Figure 5:
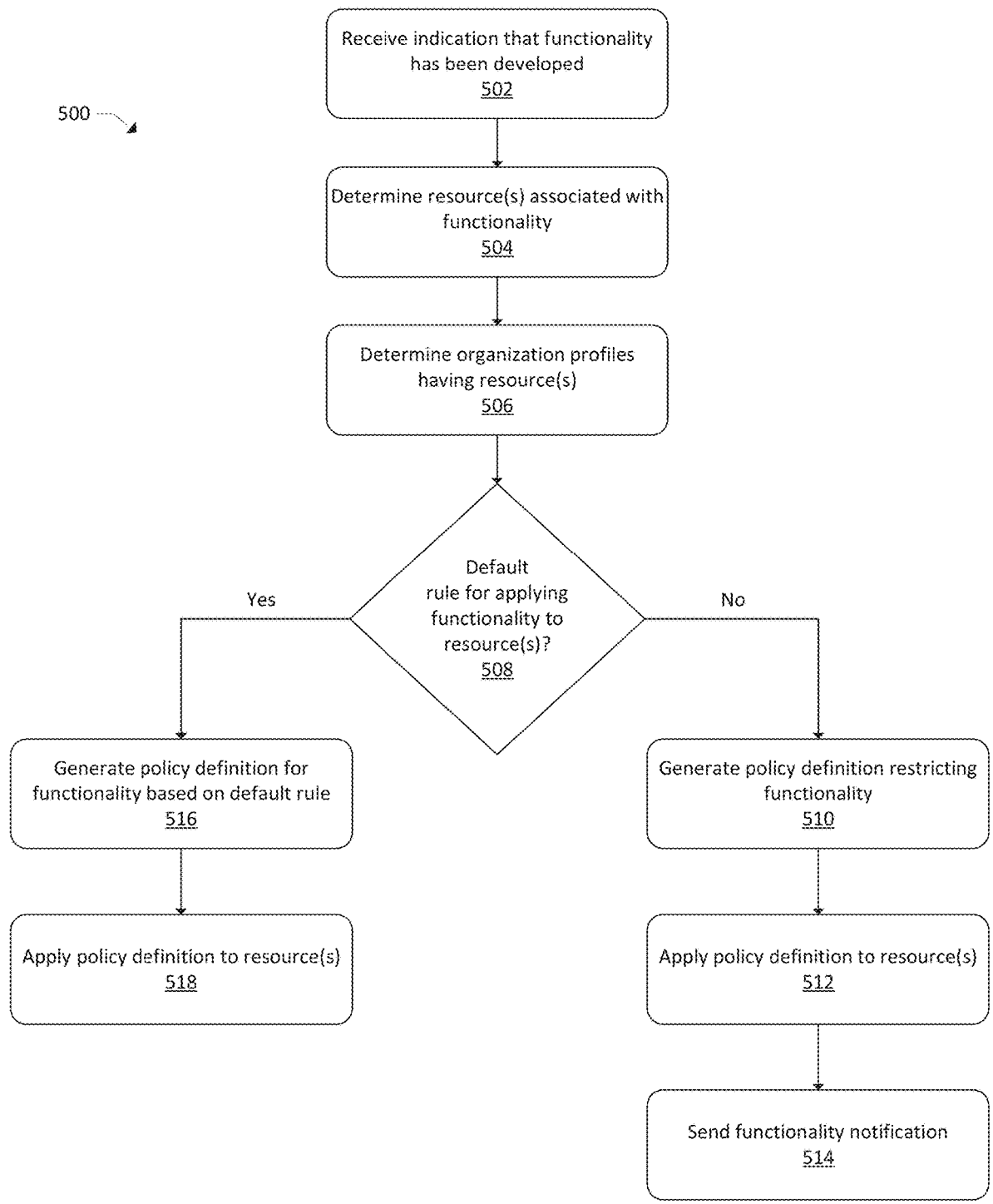
FIG. 5 illustrates a flow diagram of an example process for applying newly-developed functionality to related resources.

FIG. 5 illustrates a flow diagram of an example process 500 for applying newly-developed functionality to related resources. The order in which the operations or steps are described is not intended to be construed as a limitation, and any number of the described operations may be combined in any order and/or in parallel to implement process 500.

At block 502, the process 500 may include receiving an indication that a functionality has been developed. For example, developers may periodically or otherwise develop new functionalities that may be utilized by certain resources. In examples, the new functionality may have been developed for use in a certain domain, such as for devices related to the healthcare field, residential customers, banking customers, etc. The indication may include details of the new functionality as well as information about the resources that may employ the functionality. For example, if the functionality is associated with image data, the indication may include this information and indicate that applicable resources are those that have cameras or are otherwise capable of acquiring image data.

At block 504, the process 500 may include determining one or more resources associated with the functionality. For example, a rules component may determine the resource identifiers corresponding to resources across multiple organizations that are associated with the new functionality. The resource database, as described in more detail herein, may be queried for the resource identifiers, and the tags as described herein may be utilized to determine which of the resource identifiers are associated with resources that may utilize the new functionality.

At block 506, the process 500 may include determining one or more organization profiles associated with the one or more resources. For example, the resource database may indicate which organization identifiers and/or principal identifiers are associated with the identified resources. In other examples, a user registry of the remote system may store associations between organizations and devices, and this information may be utilized to obtain the organization identifiers.

At block 508, the process 500 may include determining whether a default rule for applying the functionality to the one or more resources has been generated and/or received. For example, the developer of the new functionality may indicate whether the functionality should be enabled automatically without user input or whether the functionality should be disabled until specifically requested to be enabled by a user of a given organization. In other examples, based at least in part on the functionality at issue and/or privacy concerns and/or user settings, the remote system may generate the default rule for applying the functionality.

In instances where a default rule has not been generated and/or received, the process 500 may include, at block 510, generating a policy definition restricting the functionality. For example, the remote system may err on the side of caution by restricting the functionality until expressly requested by an organization. By way of example, if the new functionality allows for one device to automatically cause another device to establish a communication channel, that functionality may be desirable in a residential scenario but not in a workplace scenario. As such, in the absence of a default rule as provided by a developer of the functionality, the remote system may generate a policy definition that restricts the functionality until an organization enables the functionality.

At block 512, the process 500 may include applying the policy definition to the one or more resources. Applying the policy definition may include associating the policy definition with the resource. Thereafter, when a request to utilize the functionality is received, the policy definition may be utilized to determine whether to permit or restrict use of the functionality by the principal associated with the request.

At block 514, the process 500 may include sending a functionality notification to one or more devices indicating that the functionality is available. For example, when the functionality is enabled by the default rule, a notification may be sent to one or more approved devices associated with the organizations having the resources. The notification may indicate that the functionality is now available and that it was automatically enabled for use. In examples where the functionality is not enabled by the default rule, the notification may indicate that the functionality is available but that it was automatically disabled. A user interface may be utilized for receiving user input to enable the functionality, and a new policy definition may be generated for that functionality.

Returning to block 508, in instances where a default rule has been generated and/or received, the process 500 may include, at block 516, generating a policy definition for the functionality based at least in part on the default rule. Generating the policy definition may be performed in the same or a similar manner as described with respect to block 510.

At block 518, the process 500 may include applying the policy definition to the one or more resources. Applying the policy definition may be performed in the same or a similar manner as described with respect to block 512.

Figure 6:
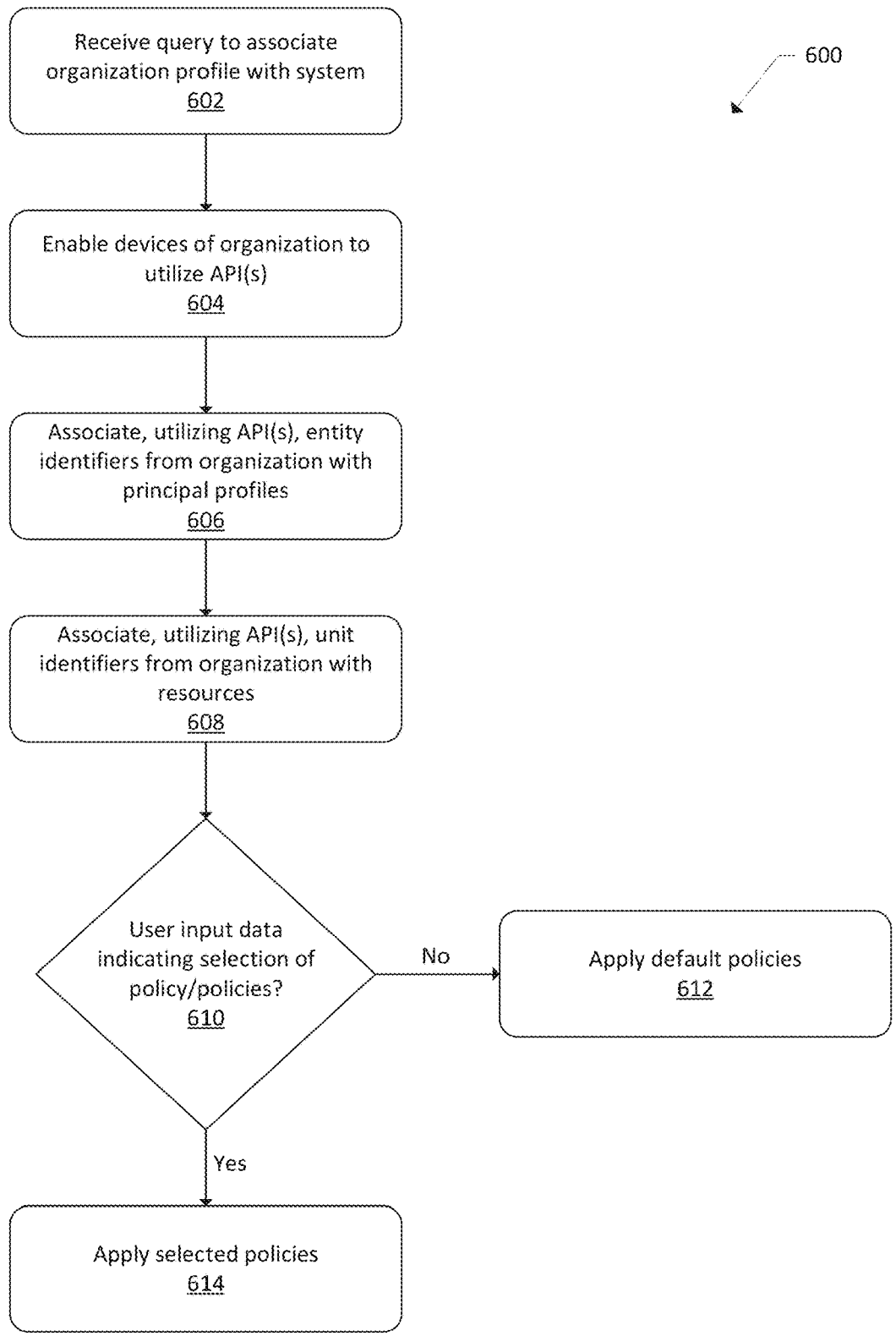
FIG. 6 illustrates a flow diagram of an example process for mapping entity profiles of an organization to principal profiles and resources.

FIG. 6 illustrates a flow diagram of an example process 600 for mapping entity profiles of an organization to principal profiles and resources. The order in which the operations or steps are described is not intended to be construed as a limitation, and any number of the described operations may be combined in any order and/or in parallel to implement process 600.

At block 602, the process 600 may include receiving a query to associate an organization profile with a system having speech processing capabilities. For example, the query may indicate an intent to integrate an organizational system of entities and devices with principal profiles and resources of the speech processing system. The query may cause a secure connection with be established between the organization system and the speech processing system and allow for the acquisition of details about the organization.

At block 604, the process 600 may include enabling a device associated with the organization to utilize one or more APIs. For example, the APIs may define interactions between software applications of the organization system and applications of the speech processing system. For example, the APIs may be utilized to receive data associated with entities of a given organization, such as employees. The organization-related system may store information about its employees, such as in an employee database. The employee information may include user identifiers, titles and/or positions, managerial responsibilities, administrative responsibility, etc. The organization-related system may also store information about devices associated with the organization, such as voice interface devices and/or other devices that are configured to be operated utilizing the voice interface applications. The APIs may also be utilized to acquire information about the organization, such as an organization type, a geographic location of the organization, and/or any other information about the organization.

At block 606, the process 600 may include associating, utilizing the one or more APIs, entity identifiers from the organization with principal profiles. For example, the APIs may be utilized to acquire this information and create principal identifiers for some or all of the organization entities. Creation of the principal identifiers may include receiving a naming indicator of the entities associated with the organization profile and creating a unique identifier of the entity in the system. These principal identifiers may be stored in a principal database.

At block 608, the process 600 may include associating, utilizing the one or more APIs, unit identifiers from the organization with resources. For example, the APIs may be utilized to acquire the device information and create resource identifiers for some or all of the organization devices. These resource identifiers may be stored in a resource database. In other examples, units that are not necessarily devices, such as room identifiers, grouping identifiers, etc. may be utilized.

At block 610, the process 600 may include determining whether user input data is received indicating selection of one or more policies. For example, the APIs may be utilized to send data indicating preexisting policies and/or permissions that may be applied to the organization's principal profiles and resources. For example, the remote system and/or another organization may have already developed policies that have been previously applied to other principal profiles and resources. Indicators of these policies and/or permissions may be presented utilizing a user interface. In these examples, a user associated with the organization may select one or more of the permissions and/or policies to apply to given principal profiles and given resources of the organization. In examples, the remote system may determine which policies and/or permissions to present via the user interface based at least in part on the organization type of the organization, the number of principal profiles associated with the organization, the number and/or type of resources associated with the organization, etc.

In instances where such user input data is not received, the process 600 may include, at block 612, applying a default policy to use of the one or more resources by principal profiles associated with the organization. For example, certain default policies and/or permissions may be associated with the organization type of the organization. These default policies may be applied until user input is received and/or until additional data is received indicating that different and/or additional policies should be applied.

In instances where such user input data is received, the process 600 may include, at block 614, applying the selected policy and/or policies. For example, user input data may be received via the user interface indicating selection of a given permission and/or policy and the remote system may utilize that user input data to generate a policy to be applied to use of the organization's principal profiles and resources. For example, the user may select a group of principal profiles and indicate permissions that may apply to use of a group of resources by that group of principal profiles. A policy may be generated indicating this permitted use.

Figure 7:
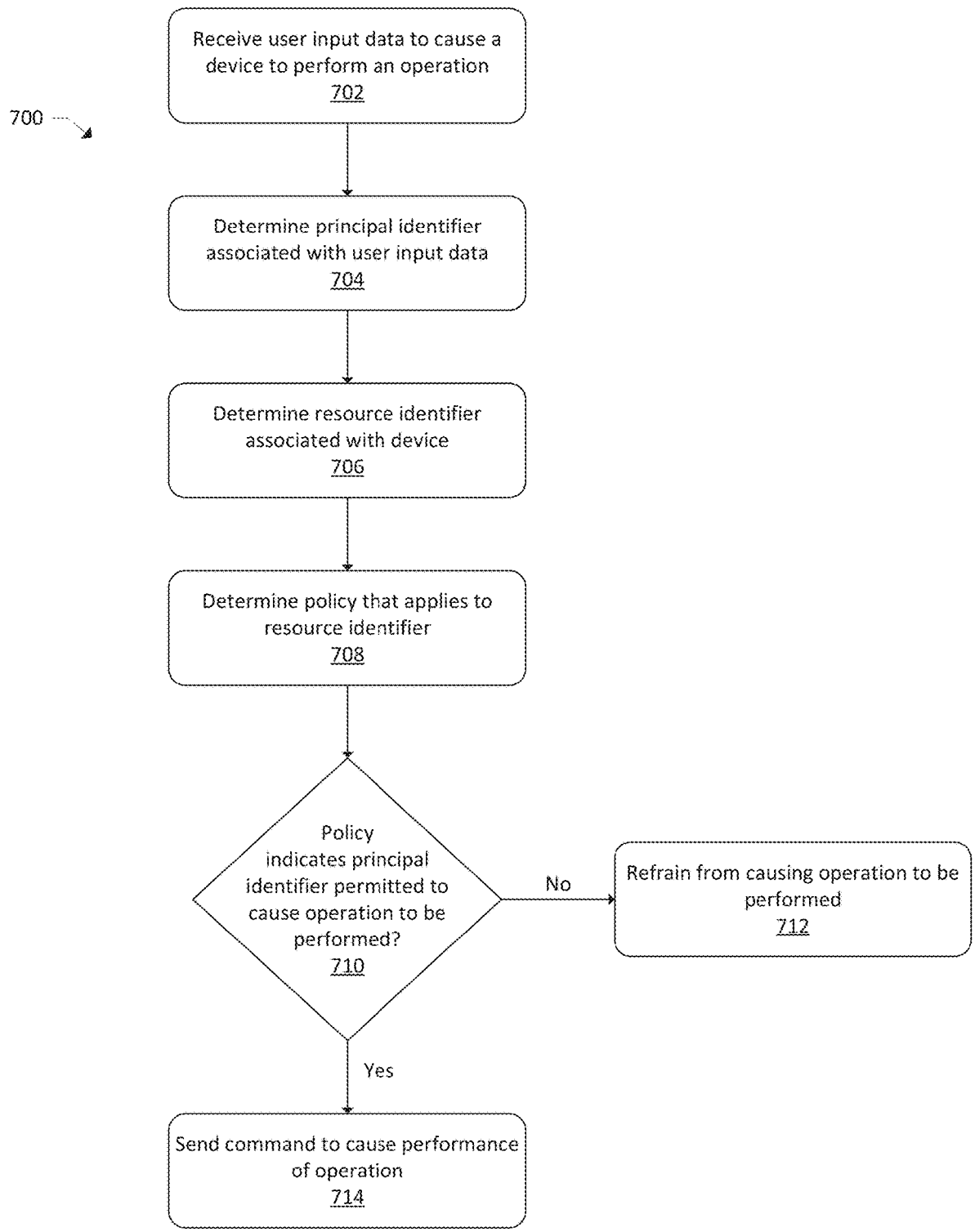
FIG. 7 illustrates a flow diagram of an example process for access control when a request to operate a resource is received.

FIG. 7 illustrates a flow diagram of an example process 700 for access control when a request to operate a resource is received. The order in which the operations or steps are described is not intended to be construed as a limitation, and any number of the described operations may be combined in any order and/or in parallel to implement process 700.

At block 702, the process 700 may include receiving user input data to cause a device to perform an operation. The user input data may include selection of a graphical user interface element as displayed to a user. The user input data may additionally, or alternatively, include audio data provided to a voice user interface. The user input data may indicate the device to perform the operation, an indicator of the user, and/or contextual information associated with the request.

At block 704, the process 700 may include determining a principal identifier associated with the user input data. The principal identifier may be determined, for example, based at least in part on the device from which the request was received, an environment in which the request was received, a voice profile associated with the audio data, image data, and/or any other means to identify the user associated with the request.

At block 706, the process 700 may include determining a resource identifier associated with the device. The resource identifier may be determined, for example, by utilizing the device identifier from the request and/or by utilizing device inference techniques. For example, when the user input data is audio data, the user utterance may provide an indication of the device to be acted upon, such as "print this document to Printer A." In this example, the user utterance includes an identifier of "Printer A" as the device in question. In other examples, the user utterance may not provide an explicit indicator of the device, such as a user utterance of "print this document to the printer." In this example, the user utterance includes information about the device, but without an explicit inclusion of the device name. Device inference techniques may be utilized to infer a device that corresponds to "the printer." These techniques may include identifying a space where the user is present, identifying a nearest printer, identifying printers typically used by the user, etc. The device identifier may be mapped to a resource identifier from the resource database.

At block 708, the process 700 may include determining a policy that applies to the resource identifier. For example, a policy database may be queried for policies associated with the resource identifier. The query may also be limited to policies that are associated with contextual information received with the request.

At block 710, the process 700 may include determining whether the policy indicates that the principal identifier is permitted to cause the operation to be performed. For example, a policy evaluation component may determine whether the policy indicates the principal is permitted to cause the operation to be performed based at least in part on the resource identifier at issue, the contextual information associated with the request, and a current status of the policy.

In instances where the policy indicates that the principal identifier is not permitted to cause the operation to be performed, the process 700 may include, at block 712, refraining from causing the operation to be performed. In these examples, a command to cause the operation to be perform may not be generated and/or sent to the device at issue. In some examples, a notification may be provided that the requested operation is not permitted for the principal at issue.

In instances where the policy indicates that the principal identifier is permitted to cause the operation to be performed, the process 700 may include, at block 714, sending a command to cause performance of the operation. The command may cause processors of the resource to perform the operation and/or the command may be sent to the device from which the request is received, and the command may cause processors of that device to initiate the operation. In still other examples, instead of a command, the system may send an indication that the operation is permitted, and the device may perform the operation in response to receiving the indication.

Figure 8:
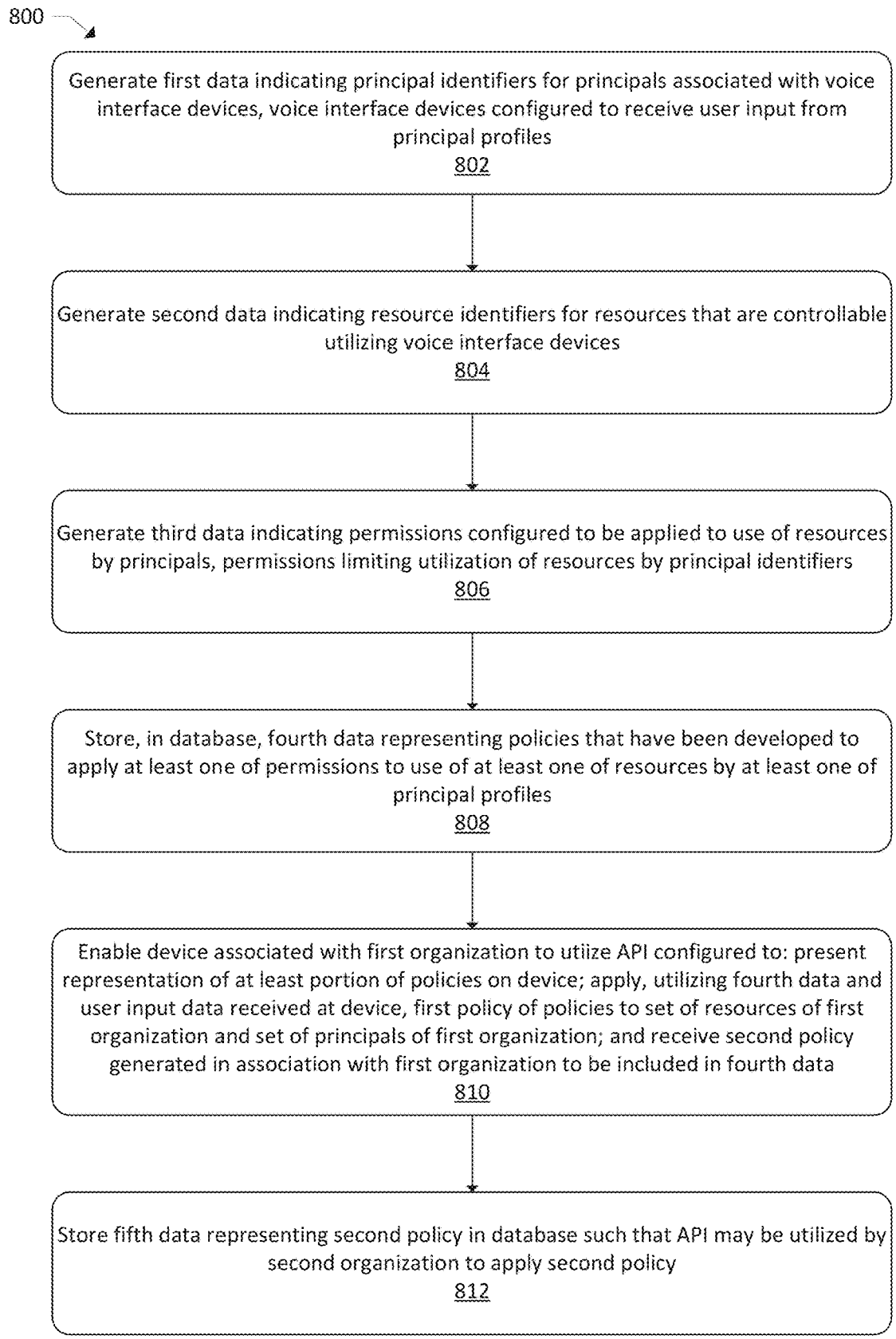
FIG. 8 illustrates a flow diagram of an example process for integration of speech processing functionality with organization systems.

FIG. 8 illustrates a flow diagram of an example process 800 for integration of speech processing functionality with organization-related systems. The order in which the operations or steps are described is not intended to be construed as a limitation, and any number of the described operations may be combined in any order and/or in parallel to implement process 800.

At block 802, the process 800 may include generating first data indicating principal identifiers for principal profiles associated with voice interface devices, the voice interface devices configured to receive user input from the principal profiles. For example, APIs may define interactions between software applications of the organization-related system and applications of the speech processing system. For example, the APIs may be utilized to receive data associated with entities of an given organization, such as employees. The organization-related system may store information about its employees, such as in an employee database. The employee information may include user identifiers, titles and/or positions, managerial responsibilities, administrative responsibility, etc. The organization-related system may also store information about devices associated with the organization profile, such as voice interface devices and/or other devices that are configured to be operated utilizing the voice interface applications. The APIs may also be utilized to acquire information about the organization, such as an organization type, a geographic location of the organization, and/or any other information about the organization. The APIs may be utilized to acquire this information and create principal identifiers for some or all of the organization entities. These principal identifiers may be stored in a principal database.

At block 804, the process 800 may include generating second data indicating resource identifiers for resources that are controllable utilizing the voice interface devices. For example, the APIs may be utilized to acquire the device information and create resource identifiers for some or all of the organization devices. These resource identifiers may be stored in a resource database. In examples, the resource identifiers may be associated with devices. In other examples, the resource identifiers may be associated with other types of units as described herein, such as room identifiers, grouping identifiers, etc.

At block 806, the process 800 may include generating third data indicating permissions configured to be applied to use of the resources by the principal profiles, the permissions limiting utilization of the resources by the principal profiles. For example, a permissions database may include identifiers of permissions that may be applied to use of resources by principal profiles. For example, one or more permissions may be generated and applied to the use of resources by principal profiles. Example permissions may include, for example, unrestricted use of the resources, limitations on resource use, permitted applications to be used, contextual information that may be required for use of the resources, conditions on resource use, and/or other permissions. For any given resource, one or more policies may apply that indicate permissions and principal profiles associated with use of that resource.

At block 808, the process 800 may include storing, in a database, fourth data representing policies that have been developed to apply at least one of the permissions to use of at least one of the resources by at least one of the principal profiles. For example, a policy database may include data representing one or more policies for the use of resources by principal profiles.

At block 810, the process 800 may include enabling a device associated with a first organization to utilize a API configured to: present a representation of at least a portion of the policies on the device; apply, utilizing the fourth data and user input data received at the device, a first policy of the policies to a set of resources of the first organization and a set of principal profiles of the first organization; and receive a second policy generated in association with the first organization to be included in the fourth data. For example, the representation of the policies may include visual representations indicating the policies and details about the policies, including permissions defining the policies. The APIs may be utilized to send data indicating preexisting policies and/or permissions that may be applied to the organization's principal profiles and resources. For example, the remote system and/or another organization may have already developed policies that have been previously applied to other principal profiles and resources. Indicators of these policies and/or permissions may be presented utilizing a user interface. In these examples, a user associated with the organization may select one or more of the permissions and/or policies to apply to given principal profiles and given resources of the organization. In examples, the remote system may determine which policies and/or permissions to present via the user interface based at least in part on the organization type of the organization, the number of principal profiles associated with the organization, the number and/or type of resources associated with the organization, etc.

User input data may be received via the user interface indicating selection of a given permission and/or policy and the remote system may utilize that user input data to generate a policy to be applied to use of the organization's principal profiles and resources. For example, the user may select a group of principal profiles and indicate permissions that may apply to use of a group of resources by that group of principal profiles. A policy may be generated indicating this permitted use. In some examples, default policies may be applied to use of an organization's resources by its principal profiles. These default policies may be based at least in part on the organization type, resource type, etc. By so doing, use of individual resources by individual principal profiles of an organization may be customized without the need to establish an account for each principal and manipulate each account to indicate permitted and unpermitted use of each individual resource. The APIs may also be utilized to allow a user to generate personalized policies. For example, if one or more of the preexisting policies does not meet the user's needs, the APIs may be configured to receive input data indicating a permission to be applied to use of a resource by a principal. The remote system may generate a corresponding policy and store that policy in the policy database. Thereafter, the policy and/or related permission may be made available to other users of the remote system.

At block 812, the process 800 may include storing fifth data representing the second policy in the database such that the API may be utilized by a second organization to apply the second policy. For example, the remote system may generate a policy and store that policy in the policy database. Thereafter, the policy and/or related permission may be made available to other users of the remote system.

Additionally, or alternatively, the process 800 may include associating a first principal type with a first group of the permissions, the first group of the permissions associated with fewer limitations than a second group of the permissions. The process 800 may also include associating a second principal type with the second group of the permissions. The process 800 may also include receiving, from the device, an indication that the set of principal profiles is associated with the first principal type. The process 800 may also include causing the device to display, in response to the indication and utilizing the API, a set of the policies that are associated with the first group of the permissions, the set of the policies including the first policy, the user input data indicating selection of the first policy from the set of the policies.

Additionally, or alternatively, the process 800 may include associating a first set of the policies with a first organization type. The process 800 may also include associating a second set of the policies with a second organization type, the second set of the policies differing from the first set of the policies. The process 800 may also include receiving, from the device, an indication that the first organization is associated with the first organization type. The process 800 may also include causing the device to display, in response to the indication and utilizing the API, the first set of the policies instead of the second set of the policies, the first set of the policies including the first policy, the user input data indicating selection of the first policy from the first set of the policies.

Additionally, or alternatively, the process 800 may include receiving a first indication of a functionality developed for use by a group of the resources, the functionality developed after applying the first policy to the set of resources of the first organization. The process 800 may also include receiving a second indication of a default permission to apply to the group of the resources, the default permission indicating authorization for the group of the resources to automatically utilize the functionality. The process 800 may also include generating sixth data representing a third policy indicating the default permission is to be applied to the group of the resources. The process 800 may also include identifying a resource associated with the first organization as one of the group of the resources. The process 800 may also include applying, utilizing the API and without user input from the device, the third policy to the resource.

FIG. 9 illustrates a flow diagram of another example process 900 for integration of speech processing functionality with organization systems. The order in which the operations or steps are described is not intended to be construed as a limitation, and any number of the described operations may be combined in any order and/or in parallel to implement process 900.

At block 902, the process 900 may include generating first data indicating principal identifiers for principal profiles associated with voice interface devices. For example, APIs may define interactions between software applications of the organization system and applications of the speech processing system. For example, the APIs may be utilized to receive data associated with entities of an given organization, such as employees. The organization-related system may store information about its employees, such as in an employee database. The employee information may include user identifiers, titles and/or positions, managerial responsibilities, administrative responsibility, etc. The organization-related system may also store information about devices associated with the organization, such as voice interface devices and/or other devices that are configured to be operated utilizing the voice interface devices. The APIs may also be utilized to acquire information about the organization, such as an organization type, a geographic location of the organization, and/or any other information about the organization. The APIs may be utilized to acquire this information and create principal identifiers for some or all of the organization entities. These principal identifiers may be stored in a principal database. The APIs may be utilized to acquire the device information and create resource identifiers for some or all of the organization devices. These resource identifiers may be stored in a resource database.

At block 904, the process 900 may include generating second data indicating resource identifiers for resources that are controllable utilizing the voice interface devices. For example, the APIs may be utilized to acquire the device information and create resource identifiers for some or all of the organization devices. These resource identifiers may be stored in a resource database.

At block 906, the process 900 may include generating third data indicating permissions configured to be applied to use of the resources by the principal profiles, the permissions indicating at least a context associated with a request to utilize the resources by the principal profiles. For example, a permissions database may include identifiers of permissions that may be applied to use of resources by principal profiles. For example, one or more permissions may be generated and applied to the use of resources by principal profiles. Example permissions may include, for example, unrestricted use of the resources, limitations on resource use, permitted applications to be used, contextual information that may be required for use of the resources, conditions on resource use, and/or other permissions. For any given resource, one or more policies may apply that indicate permissions and principal profiles associated with use of that resource. In examples, the context may indicate a room identifier associated with the resource at issue, a domain associated with the organization, a timing of a request to operate the resource at issue, etc.

At block 908, the process 900 may include storing, in a database, fourth data representing policies indicating application of at least one of the permissions to at least one of the resources and at least one of the principal profiles. For example, a policy database may include data representing one or more policies for the use of resources by principal profiles.

At block 910, the process 900 may include enabling a device associated with an organization profile to utilize a API configured to: apply, utilizing the fourth data, a first policy of the policies to a set of resources of the organization and a set of principal profiles of the organization; and receive a second policy generated in association with the organization to be included in the fourth data. For example, the representation of the policies may include visual representations indicating the policies and details about the policies, including permissions defining the policies. The APIs may be utilized to send data indicating preexisting policies and/or permissions that may be applied to the organization's principal profiles and resources. For example, the remote system and/or another organization may have already developed policies that have been previously applied to other principal profiles and resources. Indicators of these policies and/or permissions may be presented utilizing a user interface. In these examples, a user associated with the organization may select one or more of the permissions and/or policies to apply to given principal profiles and given resources of the organization. In examples, the remote system may determine which policies and/or permissions to present via the user interface based at least in part on the organization type of the organization, the number of principal profiles associated with the organization, the number and/or type of resources associated with the organization, etc.

User input data may be received via the user interface indicating selection of a given permission and/or policy and the remote system may utilize that user input data to generate a policy to be applied to use of the organization's principal profiles and resources. For example, the user may select a group of principal profiles and indicate permissions that may apply to use of a group of resources by that group of principal profiles. A policy may be generated indicating this permitted use. In some examples, default policies may be applied to use of an organization's resources by its principal profiles. These default policies may be based at least in part on the organization type, resource type, etc. By so doing, use of individual resources by individual principal profiles of an organization may be customized without the need to establish an account for each principal and manipulate each account to indicate permitted and unpermitted use of each individual resource. The APIs may also be utilized to allow a user to generate personalized policies. For example, if one or more of the preexisting policies does not meet the user's needs, the APIs may be configured to receive input data indicating a permission to be applied to use of a resource by a principal. The remote system may generate a corresponding policy and store that policy in the policy database. Thereafter, the policy and/or related permission may be made available to other users of the remote system.

Additionally, or alternatively, the process 900 may include associating a first principal type with a first group of the permissions and associating a second principal type with a second group of the permissions. The process 900 may also include receiving, from the device, an indication that the set of principal profiles is associated with the first principal type. The process 900 may also include causing the device to display, based at least in part on the indication, a set of the policies that are associated with the first group of the permissions, the set of the policies including the first policy.

Additionally, or alternatively, the process 900 may include associating a first set of the policies with a first organization type and associating a second set of the policies with a second organization type, the second set of the policies differing from the first set of the policies. The process 900 may also include receiving an indication that the organization is associated with the first organization type. The process 900 may also include causing the device to display, based at least in part on the indication, the first set of the policies instead of the second set of the policies, the first set of the policies including the first policy.

Additionally, or alternatively, the process 900 may include receiving a first indication of a functionality developed for use by a group of the resources. The process 900 may also include receiving a second indication of a default permission to apply to the group of the resources. The process 900 may also include generating fifth data representing a third policy indicating the default permission is to be applied to the group of the resources. The process 900 may also include identifying a resource associated with the organization as one of the group of the resources and applying the third policy to the resource.

Additionally, or alternatively, the process 900 may include configuring the API to query a system associated with the organization: for entity information associated with entities of the organization; and device information associated with devices of the organization. The process 900 may also include generating, utilizing the entity information, fifth data representing the set of principal profiles. The process 900 may also include generating, utilizing the device information, sixth data representing the set of resources. The process 900 may also include causing the device to display, utilizing the API: a first representation of the set of principal profiles; and a second representation of the set of resources.

Additionally, or alternatively, the process 900 may include applying a third policy to a principal of the set of principal profiles, the third policy indicating the principal is permitted to cause a notification to be output by multiple resources of the set of resources. The process 900 may also include receiving request data to output the notification, the request data indicating a request by the principal to output the notification. The process 900 may also include causing, utilizing the third policy, the multiple resources to output the notification.

Additionally, or alternatively, the process 900 may include receiving, utilizing the API, fifth data representing the second policy. The process 900 may also include determining an organization type associated with the organization. The process 900 may also include associating the fifth data with sixth data representing first policies associated with the organization type. The process 900 may also include associating the fifth data with seventh data representing second policies indicated as being applicable to multiple organization types.

Additionally, or alternatively, the process 900 may include receiving, utilizing the API, fifth data representing a permission developed in association with the organization, the permission limiting functionality of a resource having a resource type. The process 900 may also include generating a third policy applying the permission to the resource having the resource type. The process 900 may also include storing, in the database, the fifth data representing the permission associated with the resource type. In these examples, the API may be configured to display an indicator of the permission when the organization resources are associated with the resource type.

Figure 10:
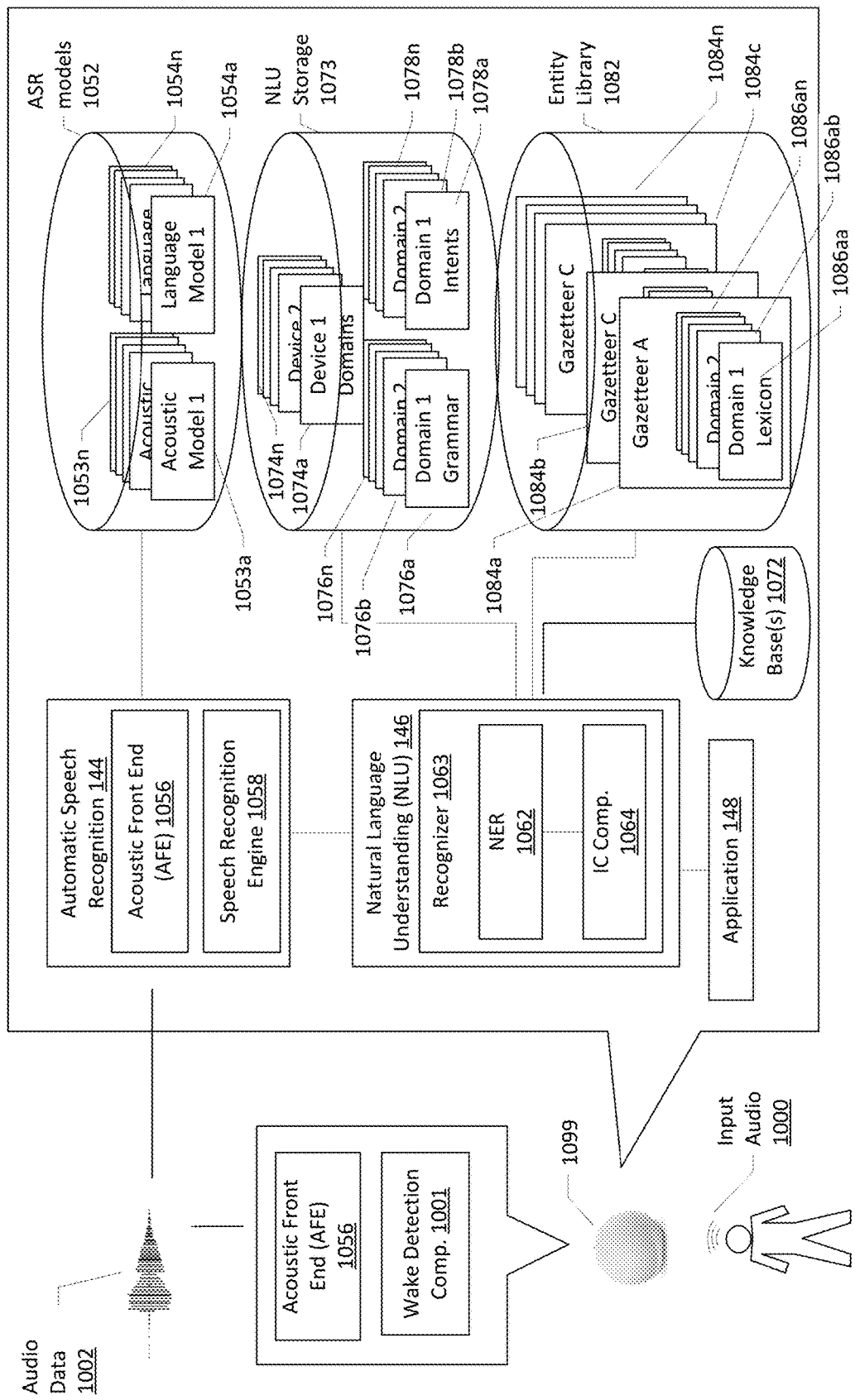
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 132. An audio capture component, such as a microphone of the device 1099, or another device, captures audio 1000 corresponding to a spoken utterance. The device 1099, using a wake word engine 1001, then processes audio data corresponding to the audio 1000 to determine if a keyword (such as a wakeword) is detected in the audio data. Following detection of a wakeword, the device 1099 processes audio data 1002 corresponding to the utterance utilizing an ASR component 144. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 144.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 1099 may "wake." The audio data 1002 may include data corresponding to the wakeword. Further, a local device may "wake" upon detection of speech/spoken audio above a threshold, as described herein. An ASR component 1090 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 144 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, order room service?" The wake detection component may identify the wake word, otherwise described as a trigger expression, "Alexa," in the user utterance and may "wake" based on identifying the wake word. The speech recognition engine 1058 may identify, determine, and/or generate text data corresponding to the user utterance, here "order room service."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 146 may include various components, including potentially dedicated processor(s), memory, storage, etc. As shown in FIG. 10, an NLU component 146 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 144 based on the utterance input audio 1000) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 1099) to complete that action. For example, if a spoken utterance is processed using ASR 144 and outputs the text "order room service" the NLU process may determine that the user intended to perform an operation associated with a custom voice interface application configured to service intents for ordering room service.

The NLU 146 may process several textual inputs related to the same utterance. For example, if the ASR 144 outputs N text segments (as part of an N-best list), the NLU may process all N outputs to obtain NLU results.

As will be discussed further below, the NLU process may be configured to parse and tag to annotate text as part of NLU processing. For example, for the text "order room service," "order" may be tagged as a command (to acquire a good or service) and "room service" may be tagged as the naming identifier of the good or service to be ordered.

To correctly perform NLU processing of speech input, an NLU process 146 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 146 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution. As used here, a domain may be associated with the custom voice interface application described elsewhere herein.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 148. The destination application 148 may be determined based on the NLU output. For example, if the NLU output includes a command to send a message, the destination application 148 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the application 148 may provide some or all of this information to a text-to-speech (TTS) engine. The TTS engine may then generate an actual audio file for outputting the audio data determined by the application (e.g., "okay," or "room service ordered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 1099 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 130, as illustrated herein are exemplary, and may be located in a stand-alone device or may be included, in whole or in part, as a component of a larger device or system, may be distributed across a network or multiple devices connected by a network, etc.

Figure 11:
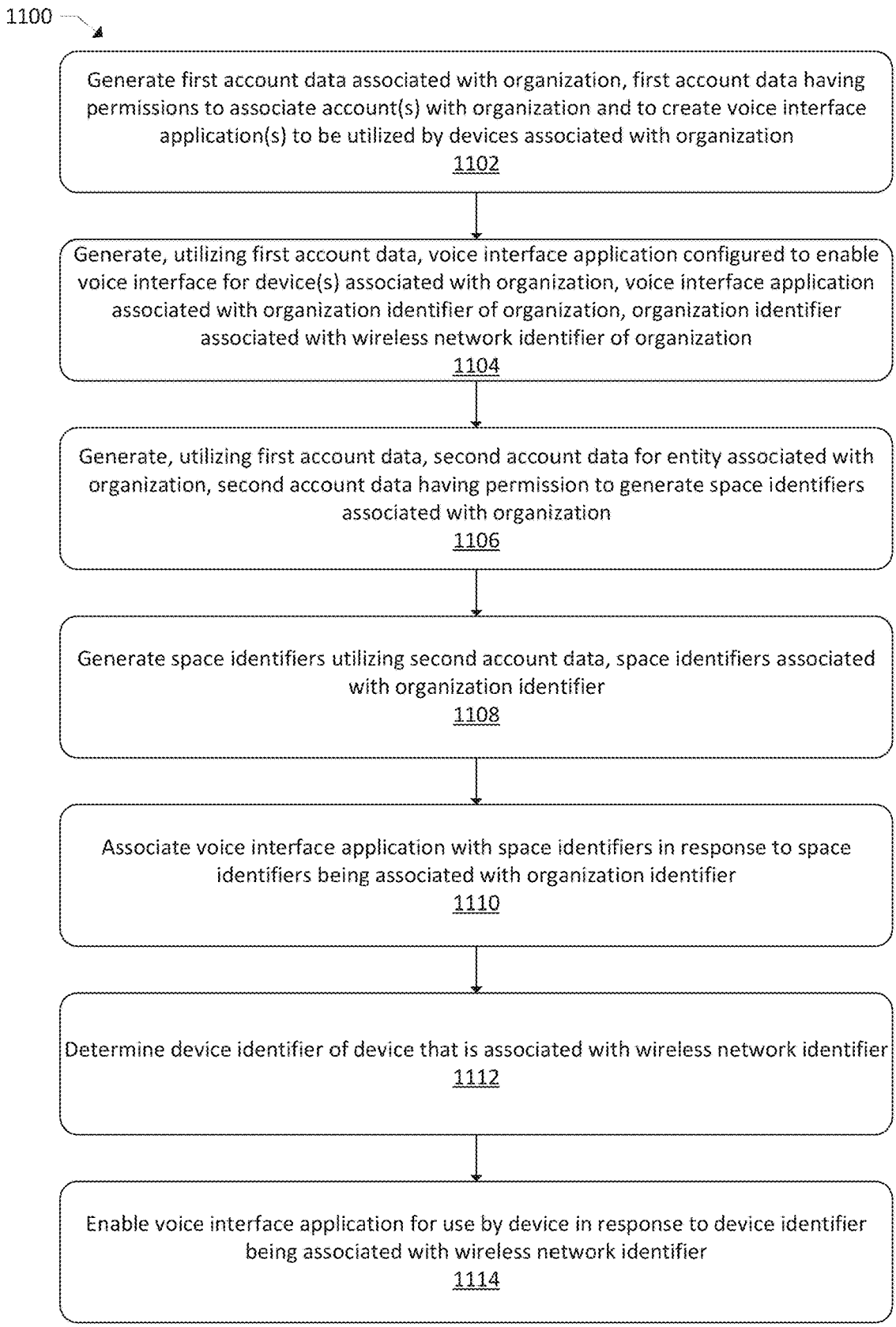
FIG. 11 illustrates a flow diagram of an example process for associating a voice interface application with devices of an organization.

FIGS. 11 and 12 illustrates processes for associating a voice interface application with devices of an organization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-10 and 13A-13E, although the processes may be implemented in a wide variety of other environments, architectures and systems.

FIG. 11 illustrates a flow diagram of an example process 1100 for associating a voice interface application with devices of an organization. The order in which the operations or steps are described is not intended to be construed as a limitation, and any number of the described operations may be combined in any order and/or in parallel to implement process 1100.

At block 1102, the process 1100 may include generating first account data associated with an organization, the first account data having permissions to associate one or more accounts with the organization and to create one or more voice interface applications to be utilized by devices associated with the organization. For example, one or more user accounts may be generated in association with a speech processing system. The user accounts may be associated with permissions and/or access controls that allow for various functionalities to be performed. By way of example, some user accounts may be enabled to create other user accounts, to assign privileges to user accounts, and/or to develop voice interface applications, which may otherwise be described herein as "skills," to be utilized by devices associated with the organization. In an example, a first user account associated with a first user may be utilized to generate a second user account associated with a second user. The second user account may be enabled to allow the second user to develop the voice interface application as described herein.

At block 1104, the process 1100 may include generating, utilizing the first account data, a voice interface application configured to enable a voice interface for one or more of the devices associated with the organization, the voice interface application associated with an organization identifier of the organization, the organization identifier associated with a wireless network identifier of the organization. For example, the second user account may be enabled to create an application account with the speech processing system for the purpose of creating a customized voice interface application for the organization. The application account may be linked or otherwise associated with a setup application, which may provide tools and/or otherwise functionality to allow the second user to develop the voice interface application. Development of the voice interface application may include the designation of wake words to be detected from audio data representing user utterances, designation of one or more intents associated with the user utterances, actions to be performed in association with the intents, "payloads" associated with the intents, permissions and/or restrictions on use of the voice interface application, etc. The development of voice interface applications and speech processing utilizing voice interface applications is described in more detail with respect to FIG. 10.

At block 1106, the process 1100 may include generating, utilizing the first account data, second account data for an entity associated with the organization, the second account data having permission to generate space identifiers associated with the organization.

At block 1108, the process 1100 may include generating the space identifiers utilizing the second account data, the space identifiers associated with the organization identifier. For example, once the voice interface application is developed, the second user account and/or a third user account with appropriate permissions, may be enabled to generate space identifiers associated with spaces of the organization. Utilizing a hotel organization by way of example, the hotel organization may be associated with a building with three floors, each having 10 rooms and a common area. The user accounts may be utilized to generate space identifiers for each of the rooms, each of the common areas, and/or each of the floors, for example. These space identifiers may be associated with an organization identifier of the organization. In examples, device identifiers of voice enabled devices in the spaces may also be generated and associated with respective spaces. In other examples, device identifiers are not provided by user input, and instead wireless network access credentials, such as WiFi passwords and/or naming indicators, may be provided for the spaces.

At block 1110, the process 1100 may include associating the voice interface application with the space identifiers in response to the space identifiers being associated with the organization identifier.

At block 1112, the process 1100 may include determining a device identifier of a device that is associated with the wireless network identifier. For example, once the space identifiers are generated, the voice interface application may be enabled for use by devices associated with the organization identifier and the space identifiers. The voice enabled devices associated with the space identifier may then be associated with the voice interface application. For example, when device identifiers are not yet known, wireless network credentials may be utilized for associating device identifiers with the voice interface application. Utilizing the hotel organization example, all of the devices associated with the 30 rooms of the hotel and the common areas may utilize the same wireless network credentials to, for example, access the Internet. Since the wireless network credentials were associated with the space identifiers and/or the organization identifier, each of the devices that utilizes the wireless network credentials may be identified and may be determined to be devices that should be enabled for utilizing the voice interface application. The device identifiers may then be associated with the voice interface application, such that the voice interface application may be utilized to perform one or more actions in response to user utterances received at the devices of the organization.

At block 1114, the process 1100 may include enabling the voice interface application for use by the device in response to the device identifier being associated with the wireless network identifier. For example, a user in one of the hotel rooms, utilizing the example above, may provide speech input to a device in the hotel room. The device may generate audio data representing the speech input and the audio data may be processed locally on the device and/or may be sent to a remote speech processing system. Because a device identifier of the device is indicated as being associated with the voice interface application, the voice interface application may be determined to be one application, potentially of several applications, that may be utilized to respond to the speech input. For example, the voice interface application may have been developed to handle user commands to order room service, checkout from the hotel, operate a smart device associated with a given room, and/or otherwise perform actions that are specific to the organization in question. Other applications that were not developed specifically for the organization in question may also be utilized, such as applications for determining the weather, outputting music, etc. As such, the audio data may be analyzed to determine intent data associated with the speech input. When the intent data indicates an intent that the custom voice interface application was configured to handle, the custom voice interface application may be called to service the intent. When the intent data indicates an intent that another application was configured to handle, that application may be called. When the custom voice interface application receives the intent data, the custom voice interface application may utilize the intent data to determine an action to be performed and/or a response to be provided to the user. For example, when a "room service" intent is determined, the custom voice interface application may be utilized to determine the food to be ordered and to generate a room service order for the food, which may be sent to a device associated with, for example, a kitchen of the hotel. The custom voice interface application may also determine a response to be output to the user, such as "your order has been placed."

Additionally, or alternatively, the process 1100 may include generating, utilizing the second account data, user profile data corresponding to a user. The process 1100 may also include enabling, utilizing the second account data, the user profile data to utilize the voice interface application in association with a first space identifier of the space identifiers, the first space identifier corresponding to a first space of the organization. The process 1100 may also include receiving, from a first device associated with the first space identifier, first audio data representing a first user utterance to perform a first command. The process 1100 may also include causing the first command to be performed utilizing the voice interface application in response to the first device being associated with the first space identifier and the first audio data being associated with the user profile data. The process 1100 may also include receiving, from a second device associated with a second space identifier, second audio data representing a second user utterance to perform a second command. The process 1100 may also include determining to refrain from causing the second command to be performed utilizing the voice interface application in response to the second device being associated with the second space identifier and the second audio data being associated with the user profile data.

Additionally, or alternatively, the process 1100 may include receiving audio data from the device, the audio data representing a user utterance. The process 1100 may also include determining the device identifier associated with the device and determining that the device identifier is associated with a space identifier of the space identifiers. The process 1100 may also include utilizing, in response to the device identifier being associated with the space identifier, the voice interface application to generate intent data corresponding to the audio data. The process 1100 may also include generating directive data utilizing the intent data, the directive data indicating a command to be performed in response to the user utterance.

Additionally, or alternatively, the process 1100 may include receiving an indication that a second device has sent first data requesting connection to a wireless access point associated with the wireless network identifier. The process 1100 may also include associating the second device with the wireless network identifier. The process 1100 may also include associating the second device with the voice interface application in response to the wireless network identifier being associated with the organization identifier.

FIG. 12 illustrates a flow diagram of another examples process for associating a voice interface application with devices of an organization. The order in which the operations or steps are described is not intended to be construed as a limitation, and any number of the described operations may be combined in any order and/or in parallel to implement process 1200.

At block 1202, the process 1200 may include generating, utilizing account data associated with an organization, a voice interface application configured to enable a voice interface for one or more devices associated with the organization, the voice interface application associated with an organization identifier of the organization, the organization identifier associated with a wireless network identifier of the organization.

At block 1204, the process 1200 may include generating space identifiers associated with the organization identifier. For example, the second user account may be enabled to create an application account with the speech processing system for the purpose of creating a customized voice interface application for the organization. The application account may be linked or otherwise associated with a setup application, which may provide tools and/or otherwise functionality to allow the second user to develop the voice interface application. Development of the voice interface application may include the designation of wake words to be detected from audio data representing user utterances, designation of one or more intents associated with the user utterances, actions to be performed in association with the intents, "payloads" associated with the intents, permissions and/or restrictions on use of the voice interface application, etc. The development of voice interface applications and speech processing utilizing voice interface applications is described in more detail with respect to FIG. 10.

At block 1206, the process 1200 may include associating the voice interface application with the space identifiers based at least in part on the space identifiers being associated with the organization identifier. For example, once the voice interface application is developed, the second user account and/or a third user account with appropriate permissions, may be enabled to generate space identifiers associated with spaces of the organization. Utilizing a hotel organization by way of example, the hotel organization may be associated with a building with three floors, each having 10 rooms and a common area. The user accounts may be utilized to generate space identifiers for each of the rooms, each of the common areas, and/or each of the floors, for example. These space identifiers may be associated with an organization identifier of the organization. In examples, device identifiers of voice enabled devices in the spaces may also be generated and associated with respective spaces. In other examples, device identifiers are not provided by user input, and instead wireless network access credentials, such as WiFi passwords and/or naming indicators, may be provided for the spaces.

At block 1208, the process 1200 may include determining a device identifier of a device that is associated with at least one of the space identifiers. For example, once the space identifiers are generated, the voice interface application may be enabled for use by devices associated with the organization identifier and the space identifiers. The voice enabled devices associated with the space identifier may then be associated with the voice interface application. For example, when device identifiers are not yet known, wireless network credentials may be utilized for associating device identifiers with the voice interface application. Utilizing the hotel organization example, all of the devices associated with the 30 rooms of the hotel and the common areas may utilize the same wireless network credentials to, for example, access the Internet. Since the wireless network credentials were associated with the space identifiers and/or the organization identifier, each of the devices that utilizes the wireless network credentials may be identified and may be determined to be devices that should be enabled for utilizing the voice interface application. The device identifiers may then be associated with the voice interface application, such that the voice interface application may be utilized to perform one or more actions in response to user utterances received at the devices of the organization.

At block 1210, the process 1200 may include enabling the voice interface application for use by the device based at least in part on the device identifier being associated with the at least one of the space identifiers. For example, a user in one of the hotel rooms, utilizing the example above, may provide speech input to a device in the hotel room. The device may generate audio data representing the speech input and the audio data may be processed locally on the device and/or may be sent to a remote speech processing system. Because a device identifier of the device is indicated as being associated with the voice interface application, the voice interface application may be determined to be one application, potentially of several applications, that may be utilized to respond to the speech input. For example, the voice interface application may have been developed to handle user commands to order room service, checkout from the hotel, operate a smart device associated with a given room, and/or otherwise perform actions that are specific to the organization in question. Other applications that were not developed specifically for the organization in question may also be utilized, such as applications for determining the weather, outputting music, etc. As such, the audio data may be analyzed to determine intent data associated with the speech input. When the intent data indicates an intent that the custom voice interface application was configured to handle, the custom voice interface application may be called to service the intent. When the intent data indicates an intent that another application was configured to handle, that application may be called. When the custom voice interface application receives the intent data, the custom voice interface application may utilize the intent data to determine an action to be performed and/or a response to be provided to the user. For example, when a "room service" intent is determined, the custom voice interface application may be utilized to determine the food to be ordered and to generate a room service order for the food, which may be sent to a device associated with, for example, a kitchen of the hotel. The custom voice interface application may also determine a response to be output to the user, such as "your order has been placed."

Additionally, or alternatively, the process 1200 may include generating user profile data corresponding to a user associated with the organization. The process 1200 may also include enabling the user profile data to utilize the voice interface application in association with a first space identifier of the space identifiers. The process 1200 may also include receiving, from a first device associated with the first space identifier, first audio data representing a first user utterance to perform a first command. The process 1200 may also include causing the first command to be performed utilizing the voice interface application based at least in part on the user profile data being enabled to utilize the voice interface application in association with the first space identifier. The process 1200 may also include receiving, from a second device associated with a second space identifier, second audio data representing a second user utterance to perform a second command. The process 1200 may also include determining to refrain from causing the second command to be performed utilizing the voice interface application based at least in part on a lack of enablement of the user profile data to utilize the voice interface application in association with the second space identifier.

Additionally, or alternatively, the process 1200 may include receiving audio data from the device, the audio data representing a user utterance. The process 1200 may also include determining the device identifier associated with the device and determining that the device identifier is associated with a space identifier of the space identifiers. The process 1200 may also include utilizing, based at least in part on the device identifier being associated with the space identifier, the voice interface application to generate intent data corresponding to the audio data.

Additionally, or alternatively, the process 1200 may include receiving an indication that a second device has sent request data to connect to a wireless access point associated with the wireless network identifier. The process 1200 may also include associating the second device with the voice interface application in response to the wireless network identifier being associated with the organization identifier.

Additionally, or alternatively, the process 1200 may include receiving first user input data indicating a first group of the space identifiers to be enabled for utilizing the voice interface application. The process 1200 may also include receiving second user input data indicating a second group of the space identifiers to be restricted from utilizing the voice interface application. The process 1200 may also include receiving first audio data representing a first command from a first device associated with a first space identifier of the first group of space identifiers. The process 1200 may also include processing the first audio data utilizing the voice interface application based at least in part on the first space identifier being associated with the first group of space identifiers. The process 1200 may also include receiving second audio data representing a second command from a second device associated with a second space identifier of the second group of space identifiers. The process 1200 may also include processing the second audio data without utilizing the voice interface application based at least in part on the second space identifier being associated with the second group of space identifiers.

Additionally, or alternatively, the process 1200 may include receiving user input data indicating an environmental context where the voice interface application is enabled for use by the device. The process 1200 may also include receiving audio data representing a user utterance from the device. The process 1200 may also include determining that the environmental context is associated with the audio data. The process 1200 may also include processing the audio data utilizing the voice interface application based at least in part on the environmental context being associated with the audio data.

Additionally, or alternatively, the process 1200 may include receiving user input data indicating a command to be performed by devices associated with a space identifier of the space identifiers upon occurrence of a trigger event. The process 1200 may also include determining that the trigger event has occurred and determining that the device is one of the devices associated with the space identifier. The process 1200 may also include causing the device to perform the command based at least in part on the device being one of the devices associated with the space identifier.

Additionally, or alternatively, the process 1200 may include storing first data indicating wireless network identifiers associated with the organization identifier. The process 1200 may also include receiving first user input data associating a first group of the space identifiers with a first wireless network identifier of the wireless network identifiers. The process 1200 may also include receiving second user input data associating a second group of the space identifiers with a second wireless network identifier of the wireless network identifiers. The process 1200 may also include causing a first device to be associated with the first wireless network identifier instead of the second wireless network identifier based at least in part on the first device being associated with the first group of the space identifiers. The process 1200 may also include causing a second device to be associated with the second wireless network identifier instead of the first wireless network identifier based at least in part on the second device being associated with the second group of the space identifiers.

Figure 13A:
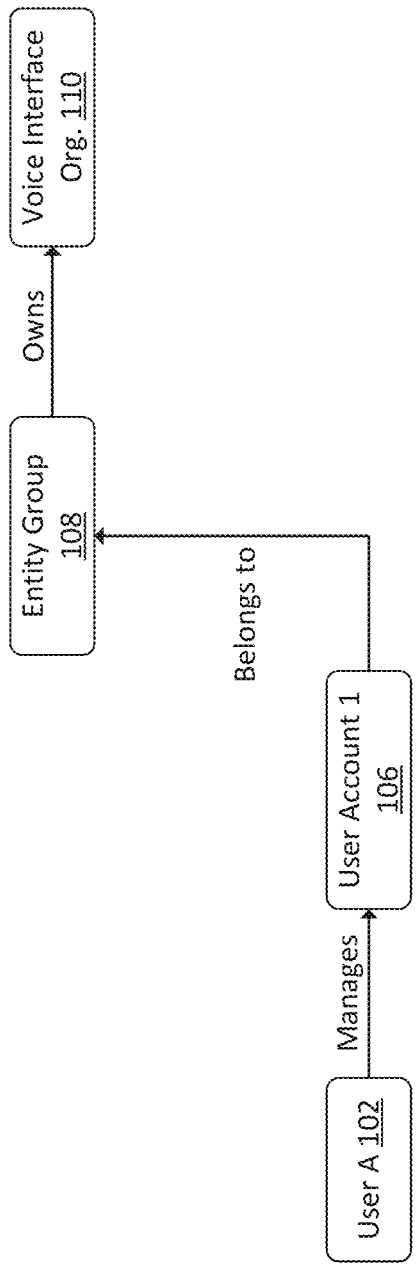
FIG. 13A illustrates a conceptual diagram of components of a system utilized for creating user account data for authorizing users to generate voice interface applications and manage use of voice interface applications.

FIG. 13A illustrates a conceptual diagram of components of a system utilized for creating user account data for authorizing users to generate voice interface applications and manage use of voice interface applications. The system may include User Account 1 106, which may be associated with User A 102.

By way of example, User Account 1 106 may be enabled to create other user accounts, to assign privileges to user accounts, and/or to develop voice interface applications, such as skills, to be utilized by devices associated with the organization. User Account 1 106 may be associated with an entity group 108 and may be considered an administrator of the entity group 108. The entity group 108 may include a group of user accounts and/or entity identifiers that are associated with a voice interface organization 110. The voice interface organization may be an organization that is configured to make associations between organization identifiers and voice interface applications as described herein. In examples, User Account 1 106 may be configured and may provide User A 102 with comprehensive functionality to manage the organization profile and use of the voice interface application.

Figure 13B:
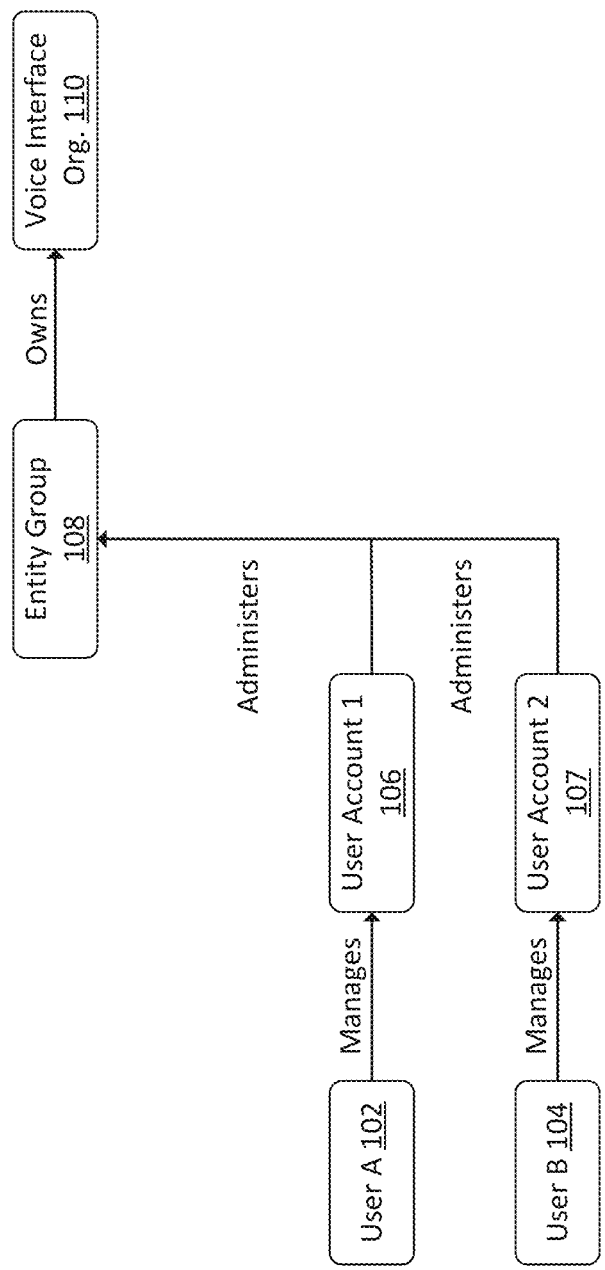
FIG. 13B illustrates a conceptual diagram of components of a system utilized for associating user accounts with an organization for management of voice interface applications.

FIG. 13B illustrates a conceptual diagram of components of a system utilized for associating user accounts with an organization for management of voice interface applications. FIG. 13B may have the same components as FIG. 13A, including User Account 1 106 associated with User A 102, the entity group 108, and the voice interface organization 110.

Additionally, FIG. 13B includes User Account 2 107, which is associated with User B 104. As shown in FIG. 13B, User A 102 may be enabled to manage User Account 1 106, and User B 104 may be enabled to manage User Account 2 107. Based on the permissions associated with User Account 1 106 and User Account 2 107, both accounts may be permitted as administers of the entity group 108 associated with the voice interface organization 110. In this example, User Account 2 107 may also be permitted to perform one or more operations that impact the organization in question. Those operations may include the generation of voice interface applications.

Figure 13C:
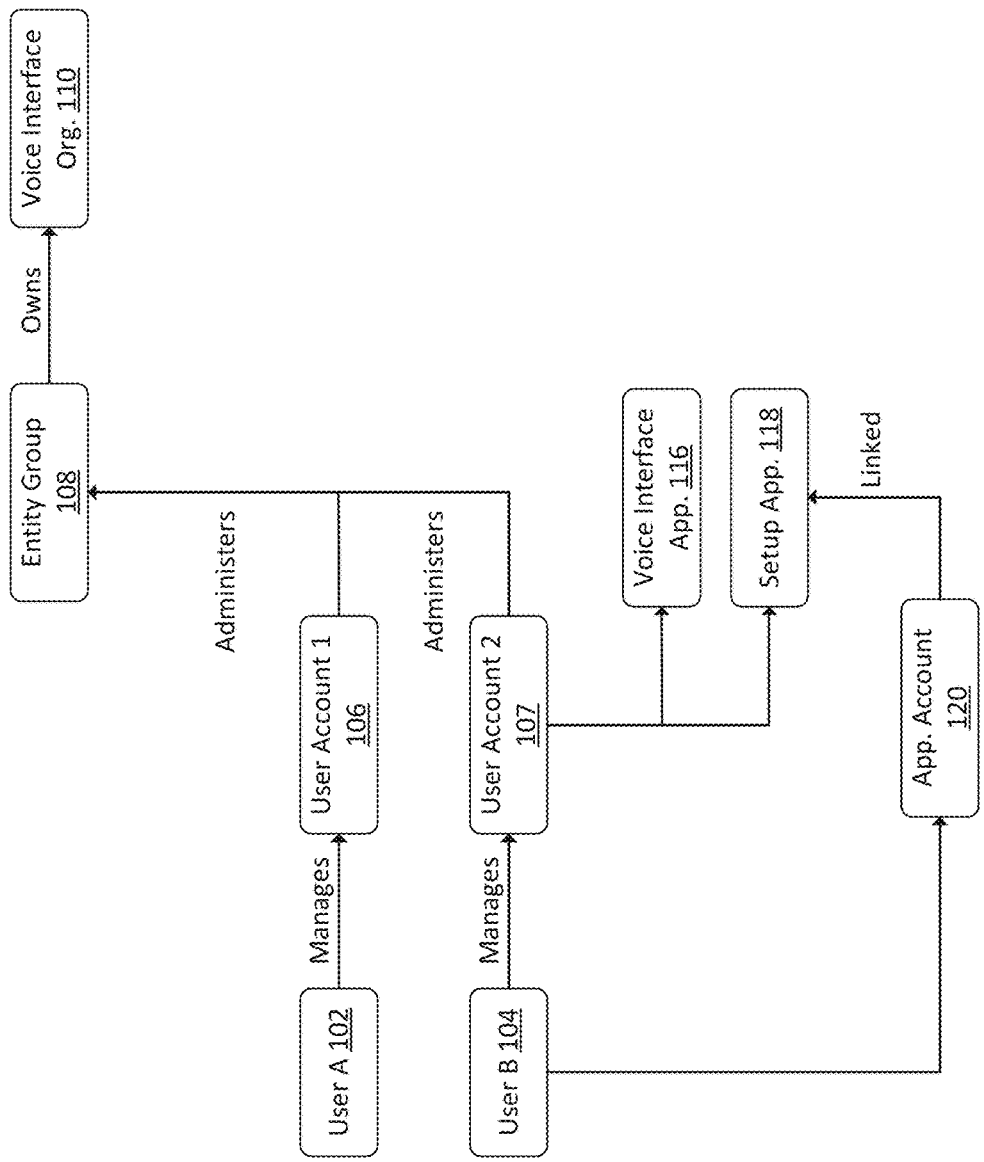
FIG. 13C illustrates a conceptual diagram of components of a system utilized for generation of a voice interface application to be associated with an organization.

FIG. 13C illustrates a conceptual diagram of components of a system utilized for generation of a voice interface application to be associated with an organization. Again, FIG. 13C may have the same components as FIG. 13B, including User Account 1 106, User Account 2 107, the entity group 108, and the voice interface organization 110. Additionally, FIG. 13C includes a voice interface application 116 developed by User B 104, a setup application 118, and/or an application account 120. In an example, User Account 2 107 may be enabled to allow the User B 104 to develop the voice interface application 116 as described herein. In these examples, User Account 2 107 may be enabled to create an application account 120 with the speech processing system for the purpose of creating a customized voice interface application 116 for the organization. The application account 120 may be linked or otherwise associated with the setup application 118, which may provide tools and/or otherwise functionality to allow User B 104 to develop the voice interface application 116. Development of the voice interface application 116 may include the designation of wake words to be detected from audio data representing user utterances, designation of one or more intents associated with the user utterances, actions to be performed in association with the intents, "payloads" associated with the intents, permissions and/or restrictions on use of the voice interface application 116, etc. The development of voice interface applications and speech processing utilizing voice interface applications is described in more detail with respect to FIG. 10.

Figure 13D:
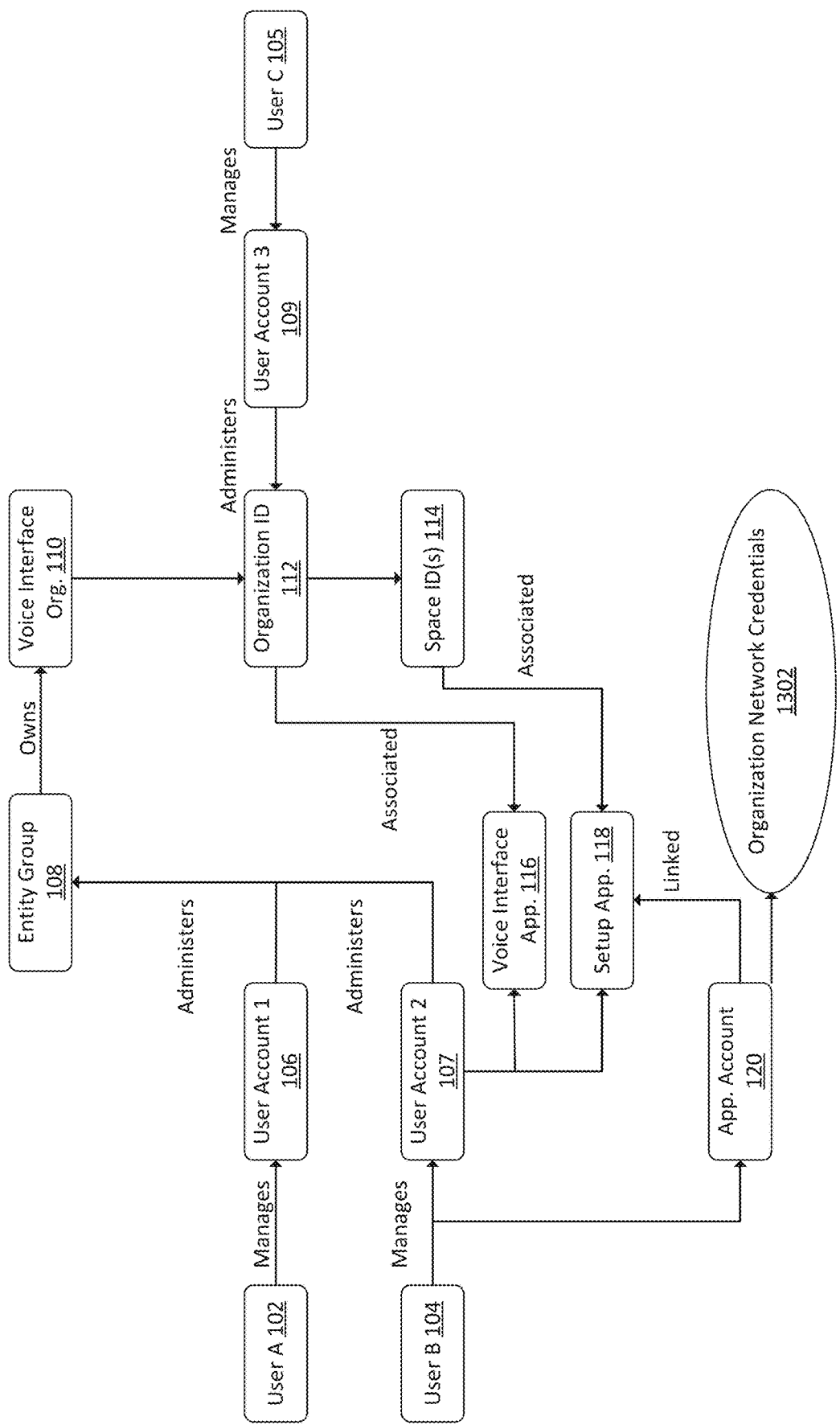
FIG. 13D illustrates a conceptual diagram of components of a system utilized for generating space identifiers to associate with an organization and for identifying wireless network identifiers for associating devices with the voice interface application.

FIG. 13D illustrates a conceptual diagram of components of a system utilized for generating space identifiers to associate with an organization and for identifying wireless network identifiers for associating devices with the voice interface application.

For example, once the voice interface application 116 is developed, User Account 2 107 and/or User Account 3 109 with appropriate permissions, may be enabled to generate space identifiers associated with spaces of the organization. Utilizing a hotel organization by way of example, the hotel organization may be associated with a building with three floors, each having 10 rooms and a common area. The user accounts may be utilized to generate space identifiers 114 for each of the rooms, each of the common areas, and/or each of the floors, for example. These space identifiers 114 may be associated with an organization identifier 112 of the organization. In examples, device identifiers of voice enabled devices in the spaces may also be generated and associated with respective spaces. In other examples, device identifiers are not provided by user input, and instead wireless network access credentials, such as WiFi passwords and/or naming indicators, may be provided for the spaces.

Once the space identifiers 114 are generated, the voice interface application 116 may be enabled for use by devices associated with the organization identifier 112 and the space identifiers 114. The voice enabled devices associated with the space identifiers 114 may then be associated with the voice interface application 116. For example, when device identifiers are not yet known, organization network credentials 1302 may be utilized for associating device identifiers with the voice interface application 116.

Figure 13E:
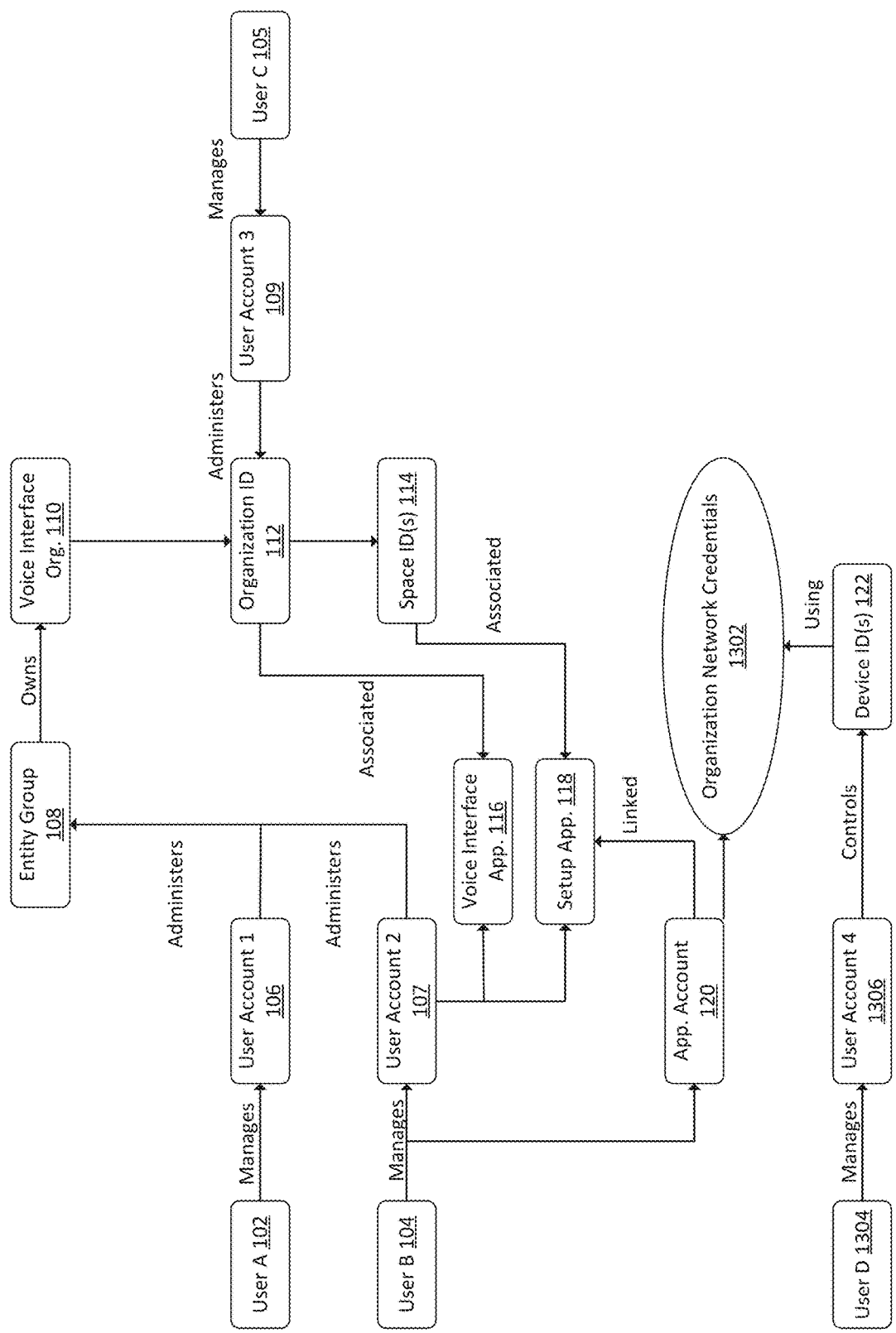
FIG. 13E illustrates a conceptual diagram of components of a system utilized for associating devices with a voice interface application utilizing wireless network identifier information.

FIG. 13E illustrates a conceptual diagram of components of a system utilized for associating devices with a voice interface application utilizing wireless network identifier information. Utilizing the hotel organization example, all of the devices associated with the 30 rooms of the hotel and the common areas may utilize the same wireless network credentials to, for example, access the Internet. Since the wireless network credentials were associated with the space identifiers 114 and/or the organization identifier 112, each of the devices that utilizes the wireless network credentials may be identified and may be determined to be devices that should be enabled for utilizing the voice interface application 116. The device identifiers 122 may then be associated with the voice interface application 116, such that the voice interface application 116 may be utilized to perform one or more actions in response to user utterances received at the devices of the organization.

For example, a user in one of the hotel rooms, utilizing the example above, may provide speech input to a device in the hotel room. The device may generate audio data representing the speech input and the audio data may be processed locally on the device and/or may be sent to a remote speech processing system. Because a device identifier 122 of the device is indicated as being associated with the voice interface application 116, the voice interface application 116 may be determined to be one application, potentially of several applications, that may be utilized to respond to the speech input. For example, the voice interface application 116 may have been developed to handle user commands to order room service, checkout from the hotel, operate a smart device associated with a given room, and/or otherwise perform actions that are specific to the organization in question. Other applications that were not developed specifically for the organization in question may also be utilized, such as applications for determining the weather, outputting music, etc. As such, the audio data may be analyzed to determine intent data associated with the speech input. When the intent data indicates an intent that the custom voice interface application 116 was configured to handle, the custom voice interface application 116 may be called to service the intent. When the intent data indicates an intent that another application was configured to handle, that application may be called. When the custom voice interface application 116 receives the intent data, the custom voice interface application 116 may utilize the intent data to determine an action to be performed and/or a response to be provided to the user. For example, when a "room service" intent is determined, the custom voice interface application 116 may be utilized to determine the food to be ordered and to generate a room service order for the food, which may be sent to a device associated with, for example, a kitchen of the hotel. The custom voice interface application 116 may also determine a response to be output to the user, such as "your order has been placed."

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
generating first account data associated with an organization, the first account data having permissions to associate one or more accounts with the organization and to create one or more voice interface applications to be utilized by devices associated with the organization;
generating, utilizing the first account data, a voice interface application configured to enable a voice interface for one or more of the devices associated with the organization, the voice interface application associated with an organization identifier of the organization, the organization identifier associated with a wireless network identifier of the organization;
generating, utilizing the first account data, second account data for an entity associated with the organization, the second account data having permission to generate space identifiers associated with the organization;
generating the space identifiers utilizing the second account data, the space identifiers associated with the organization identifier;
associating the voice interface application with the space identifiers in response to the space identifiers being associated with the organization identifier;
determining a device identifier of a device that is associated with the wireless network identifier; and
enabling the voice interface application for use by the device in response to the device identifier being associated with the wireless network identifier.

2. The system of claim 1, the operations further comprising:
generating, utilizing the second account data, user profile data corresponding to a user;
enabling, utilizing the second account data, the user profile data to utilize the voice interface application in association with a first space identifier of the space identifiers, the first space identifier corresponding to a first space of the organization;
receiving, from a first device associated with the first space identifier, first audio data representing a first user utterance to perform a first command;
causing the first command to be performed utilizing the voice interface application in response to the first device being associated with the first space identifier and the first audio data being associated with the user profile data;
receiving, from a second device associated with a second space identifier, second audio data representing a second user utterance to perform a second command; and
determining to refrain from causing the second command to be performed utilizing the voice interface application in response to the second device being associated with the second space identifier and the second audio data being associated with the user profile data.

3. The system of claim 1, the operations further comprising:
receiving audio data from the device, the audio data representing a user utterance;
determining the device identifier associated with the device;

determining that the device identifier is associated with a space identifier of the space identifiers;
utilizing, in response to the device identifier being associated with the space identifier, the voice interface application to generate intent data corresponding to the audio data; and
generating directive data utilizing the intent data, the directive data indicating a command to be performed in response to the user utterance.

4. The system of claim 1, the operations further comprising:
receiving an indication that a second device has sent first data requesting connection to a wireless access point associated with the wireless network identifier;
associating the second device with the wireless network identifier; and
associating the second device with the voice interface application in response to the wireless network identifier being associated with the organization identifier.

5. A method, comprising:
generating, utilizing account data associated with an organization, a voice interface application configured to enable a voice interface for one or more devices associated with the organization, the voice interface application associated with an organization identifier of the organization, the organization identifier associated with a wireless network identifier of the organization;
generating space identifiers associated with the organization identifier;
associating the voice interface application with the space identifiers based at least in part on the space identifiers being associated with the organization identifier;
determining a device identifier of a device that is associated with at least one of the space identifiers; and
enabling the voice interface application for use by the device based at least in part on the device identifier being associated with the at least one of the space identifiers.

6. The method of claim 5, further comprising:
generating user profile data corresponding to a user associated with the organization;
enabling the user profile data to utilize the voice interface application in association with a first space identifier of the space identifiers;
receiving, from a first device associated with the first space identifier, first audio data representing a first user utterance to perform a first command;
causing the first command to be performed utilizing the voice interface application based at least in part on the user profile data being enabled to utilize the voice interface application in association with the first space identifier;
receiving, from a second device associated with a second space identifier, second audio data representing a second user utterance to perform a second command; and
determining to refrain from causing the second command to be performed utilizing the voice interface application based at least in part on a lack of enablement of the user profile data to utilize the voice interface application in association with the second space identifier.

7. The method of claim 5, further comprising:
receiving audio data from the device, the audio data representing a user utterance;
determining the device identifier associated with the device;
determining that the device identifier is associated with a space identifier of the space identifiers; and
utilizing, based at least in part on the device identifier being associated with the space identifier, the voice interface application to generate intent data corresponding to the audio data.

8. The method of claim 5, further comprising:
receiving an indication that a second device has sent request data to connect to a wireless access point associated with the wireless network identifier; and
associating the second device with the voice interface application in response to the wireless network identifier being associated with the organization identifier.

9. The method of claim 5, further comprising:
receiving first user input data indicating a first group of the space identifiers to be enabled for utilizing the voice interface application;
receiving second user input data indicating a second group of the space identifiers to be restricted from utilizing the voice interface application;
receiving first audio data representing a first command from a first device associated with a first space identifier of the first group of space identifiers;
processing the first audio data utilizing the voice interface application based at least in part on the first space identifier being associated with the first group of space identifiers;
receiving second audio data representing a second command from a second device associated with a second space identifier of the second group of space identifiers; and
processing the second audio data without utilizing the voice interface application based at least in part on the second space identifier being associated with the second group of space identifiers.

10. The method of claim 5, further comprising:
receiving user input data indicating an environmental context where the voice interface application is enabled for use by the device;
receiving audio data representing a user utterance from the device;
determining that the environmental context is associated with the audio data; and
processing the audio data utilizing the voice interface application based at least in part on the environmental context being associated with the audio data.

11. The method of claim 5, further comprising:
receiving user input data indicating a command to be performed by devices associated with a space identifier of the space identifiers upon occurrence of a trigger event;
determining that the trigger event has occurred;
determining that the device is one of the devices associated with the space identifier; and
causing the device to perform the command based at least in part on the device being one of the devices associated with the space identifier.

12. The method of claim 5, further comprising:
storing first data indicating wireless network identifiers associated with the organization identifier;
receiving first user input data associating a first group of the space identifiers with a first wireless network identifier of the wireless network identifiers;
receiving second user input data associating a second group of the space identifiers with a second wireless network identifier of the wireless network identifiers;
causing a first device to be associated with the first wireless network identifier instead of the second wireless network identifier based at least in part on the first device being associated with the first group of the space identifiers; and causing a second device to be associated with the second wireless network identifier instead of the first wireless network identifier based at least in part on the second device being associated with the second group of the space identifiers.

13. A system, comprising:

one or more processors; and non-transitory computer-readable media storing computer-executable instructions that, when executed by the one or more processors, cause the one or more processors to perform operations comprising:

generating, utilizing account data associated with an organization, a voice interface application configured to enable a voice interface for one or more devices associated with the organization, the voice interface application associated with an organization identifier of the organization, the organization identifier associated with a wireless network identifier of the organization;

generating space identifiers associated with the organization identifier;

associating the voice interface application with the space identifiers in response to the space identifiers being associated with the organization identifier;

determining a device identifier of a device that is associated with at least one of the space identifiers; and enabling the voice interface application for use by the device based at least in part on the device identifier being associated with the at least one of the space identifiers.

14. The system of claim 13, the operations further comprising:

generating user profile data corresponding to a user associated with the organization;

enabling the user profile data to utilize the voice interface application in association with a first space identifier of the space identifiers;

receiving, from a first device associated with the first space identifier, first audio data representing a first user utterance to perform a first command;

causing the first command to be performed utilizing the voice interface application based at least in part on the user profile data being enabled to utilize the voice interface application in association with the first space identifier;

receiving, from a second device associated with a second space identifier, second audio data representing a second user utterance to perform a second command; and determining to refrain from causing the second command to be performed utilizing the voice interface application based at least in part on a lack of enablement of the user profile data to utilize the voice interface application in association with the second space identifier.

15. The system of claim 13, the operations further comprising:

receiving audio data from the device, the audio data representing a user utterance;

determining the device identifier associated with the device;

determining that the device identifier is associated with a space identifier of the space identifiers; and utilizing, based at least in part on the device identifier being associated with the space identifier, the voice interface application to generate intent data corresponding to the audio data.

16. The system of claim 13, the operations further comprising:

receiving an indication that a second device has sent request data to connect to a wireless access point associated with the wireless network identifier; and associating the second device with the voice interface application in response to the wireless network identifier being associated with the organization identifier.

17. The system of claim 13, the operations further comprising:

receiving first user input data indicating a first group of the space identifiers to be enabled for utilizing the voice interface application;

receiving second user input data indicating a second group of the space identifiers to be restricted from utilizing the voice interface application;

receiving first audio data representing a first command from a first device associated with a first space identifier of the first group of space identifiers;

processing the first audio data utilizing the voice interface application based at least in part on the first space identifier being associated with the first group of space identifiers;

receiving second audio data representing a second command from a second device associated with a second space identifier of the second group of space identifiers; and processing the second audio data without utilizing the voice interface application based at least in part on the second space identifier being associated with the second group of space identifiers.

18. The system of claim 13, the operations further comprising:

receiving user input data indicating an environmental context where the voice interface application is enabled for use by the device;

receiving audio data representing a user utterance from the device;

determining that the environmental context is associated with the audio data; and processing the audio data utilizing the voice interface application based at least in part on the environmental context being associated with the audio data.

19. The system of claim 13, the operations further comprising:

receiving user input data indicating a command to be performed by devices associated with a space identifier of the space identifiers upon occurrence of a trigger event;

determining that the trigger event has occurred;

determining that the device is one of the devices associated with the space identifier; and causing the device to perform the command based at least in part on the device being one of the devices associated with the space identifier.

20. The system of claim 13, the operations further comprising:

storing first data indicating wireless network identifiers associated with the organization identifier;

receiving first user input data associating a first group of the space identifiers with a first wireless network identifier of the wireless network identifiers;

receiving second user input data associating a second group of the space identifiers with a second wireless network identifier of the wireless network identifiers;

causing a first device to be associated with the first wireless network identifier instead of the second wireless network identifier based at least in part on the first device being associated with the first group of the space identifiers; and causing a second device to be associated with the second wireless network identifier instead of the first wireless network identifier based at least in part on the second device being associated with the second group of the space identifiers.

* * * * *